US010729150B2

(12) United States Patent
Pedersen et al.

(10) Patent No.: US 10,729,150 B2
(45) Date of Patent: Aug. 4, 2020

(54) HIGH PROTEIN, FRUIT FLAVOURED BEVERAGE; HIGH PROTEIN, FRUIT AND VEGETABLE PREPARATION; AND RELATED METHODS AND FOOD PRODUCTS

(71) Applicant: ARLA FOODS AMBA, Viby J (DK)

(72) Inventors: Henrik Pedersen, Viby J (DK); Morten Tingleff, Viby J (DK)

(73) Assignee: ARLA FOODS AMBA, Viby J (DK)

( * ) Notice: Subject to any disclaimer, the term of this patent is extended or adjusted under 35 U.S.C. 154(b) by 444 days.

(21) Appl. No.: 15/031,217

(22) PCT Filed: Oct. 23, 2014

(86) PCT No.: PCT/EP2014/072791
§ 371 (c)(1),
(2) Date: Apr. 21, 2016

(87) PCT Pub. No.: WO2015/059246
PCT Pub. Date: Apr. 30, 2015

(65) Prior Publication Data
US 2016/0262412 A1 Sep. 15, 2016

(30) Foreign Application Priority Data

Oct. 23, 2013 (DK) .................... 2013 70612

(51) Int. Cl.
| A23C 9/13 | (2006.01) |
| A23C 9/133 | (2006.01) |
| A23L 33/19 | (2016.01) |
| A23L 19/00 | (2016.01) |
| A23L 2/02 | (2006.01) |
| A23L 2/66 | (2006.01) |
| A23C 9/123 | (2006.01) |
| A23L 2/56 | (2006.01) |
| A23L 2/60 | (2006.01) |
| A23L 2/68 | (2006.01) |

(52) U.S. Cl.
CPC ............ *A23C 9/1307* (2013.01); *A23C 9/133* (2013.01); *A23C 9/1315* (2013.01); *A23L 19/09* (2016.08); *A23L 33/19* (2016.08); *A23C 9/123* (2013.01); *A23L 2/02* (2013.01); *A23L 2/56* (2013.01); *A23L 2/60* (2013.01); *A23L 2/66* (2013.01); *A23L 2/68* (2013.01); *A23V 2002/00* (2013.01)

(58) Field of Classification Search
CPC ....... A23C 9/1307; A23C 21/06; A23L 33/19; A23L 2/66; A23J 1/20; A23J 1/205
USPC ...................................................... 426/657
See application file for complete search history.

(56) References Cited

U.S. PATENT DOCUMENTS

| 4,734,287 | A | * | 3/1988 | Singer ..................... A23J 3/08 |
| | | | | 426/41 |
| 5,096,731 | A | | 3/1992 | Singer et al. |
| 5,350,590 | A | | 9/1994 | McCarthy et al. |
| 5,968,586 | A | | 10/1999 | Etzel |
| 6,106,874 | A | | 8/2000 | Liebrecht et al. |
| 6,605,311 | B2 | | 8/2003 | Villagran et al. |
| 6,767,575 | B1 | | 7/2004 | Huss et al. |
| 2002/0039617 | A1 | | 4/2002 | Villagran et al. |
| 2003/0194468 | A1 | | 10/2003 | Konkoly et al. |
| 2004/0156979 | A1 | | 8/2004 | Villagran et al. |
| 2006/0292275 | A1 | * | 12/2006 | Akashe ................ A21D 13/064 |
| | | | | 426/422 |
| 2008/0317910 | A1 | | 12/2008 | Vaslin et al. |
| 2010/0136203 | A1 | | 6/2010 | Sakata et al. |
| 2011/0003975 | A1 | | 6/2011 | Arase et al. |
| 2012/0114795 | A1 | * | 5/2012 | Havea ................. A23C 9/1307 |
| | | | | 426/41 |
| 2012/0121776 | A1 | | 5/2012 | Arnaudov et al. |
| 2013/0251884 | A1 | * | 9/2013 | Langrish .............. A23L 1/0029 |
| | | | | 426/616 |

FOREIGN PATENT DOCUMENTS

| AU | 2013101214 | 10/2013 |
| CN | 101347155 | 1/2009 |
| DE | 4305874 | 9/1994 |
| DE | 102006053017 | 5/2008 |
| DE | 102012216990 | 3/2013 |

(Continued)

OTHER PUBLICATIONS

Nautiyal, "Effect of Galactomannans and Low Esterified Pectin Combinations on Fruit Preparation Synersis, Rheology and Stability on Storage," International Journal of Food Science and Nutrition Engineering 2012, 2(2): pp. 6-11.
Anonymous: "Nutrition Facts and Analysis for Orange juice, raw", Sep. 17, 2013, XP055231252, Retrieved from the Internet: URL:http://web.archive.org/Web/20130917095347/http://nutritiondata.self.com/facts/fruits-and-fruit-juices/1971/2.
Anonymous: "pH Values of Common Foods and Ingredients", Jan. 1, 1995, pp. 1-2, XP055231261.
International Search Report and Written Opinion for Application No. PCT/EP2014/072793 dated Dec. 12, 2014 (10 pages).
International Preliminary Report on Patentability for Application No. PCT/EP2014/072793 dated Feb. 26, 2016 (8 pages).

(Continued)

*Primary Examiner* — Jeffrey P Mornhinweg
(74) *Attorney, Agent, or Firm* — Casimir Jones, S.C.; Lisa V. Mueller

(57) ABSTRACT

The present invention pertains to a new type of high protein, fruit flavoured beverage comprising fruit flavouring agents and high protein denatured whey protein compositions, and to a method of producing the beverage. The invention particularly pertains to fruit flavoured beverages having a protein content of at least 4% (w/w). The invention furthermore relates to high protein fruit and/or vegetable preparations which e.g. are advantageous for the production of high protein, fruit- and/or vegetable-flavoured yoghurt. The invention also relates to food products containing the high protein fruit and/or vegetable preparations and to method for producing these.

20 Claims, 1 Drawing Sheet

(56) References Cited

FOREIGN PATENT DOCUMENTS

| | | |
|---|---|---|
| EP | 0250623 A1 | 1/1988 |
| EP | 1042960 A2 | 10/2000 |
| EP | 1166655 | 1/2002 |
| EP | 1527690 | 5/2005 |
| EP | 2250906 | 11/2010 |
| JP | 2004/357582 | 12/2004 |
| WO | WO 88/05771 | 8/1988 |
| WO | WO 93/25083 | 12/1993 |
| WO | WO 97/46111 | 12/1997 |
| WO | WO 99/38393 | 8/1999 |
| WO | WO 2001/097629 | 12/2001 |
| WO | WO 02/30210 | 4/2002 |
| WO | WO 02/45522 A1 | 6/2002 |
| WO | WO 2005/102075 A1 | 11/2005 |
| WO | WO 2006/058538 | 6/2006 |
| WO | WO 2006/068521 | 6/2006 |
| WO | WO 2007/027213 | 3/2007 |
| WO | WO 2008/063115 A1 | 5/2008 |
| WO | WO 2008/092458 | 8/2008 |
| WO | WO 2009/112036 | 9/2009 |
| WO | WO 2010/043415 | 4/2010 |
| WO | WO 2010/120199 | 10/2010 |
| WO | WO 2010/144821 | 12/2010 |
| WO | WO 2012/050434 | 4/2012 |
| WO | WO 2013/065014 | 5/2013 |
| WO | WO 2013/117599 A2 | 8/2013 |
| WO | WO 2015/059243 A1 | 4/2015 |
| WO | WO 2015/059246 | 4/2015 |
| WO | WO 2015/059248 | 4/2015 |

OTHER PUBLICATIONS

International Search Report and Written Opinion for Application No. PCT/EP2014/072791 dated Mach 24, 2015 (15 pages).
International Preliminary Report on Patentability for Application No. PCT/EP2014/072791 dated Mach 24, 2016 (7 pages).
Heino, Antti T. et al., "Functional properties of native and cheese whey protein concentrate powders," International Journal of Dairy Technology, vol. 60, No. 4, Nov. 2007, pp. 277-285.
International Search Report and Written Opinion for International Application No. PCT/EP2014/072788, dated Feb. 10, 2015, 9 pages.
International Preliminary Report on Patentability for International Application No. PCT/EP2014/072788, dated Dec. 7, 2015, 15 pages.
Martinez; et al., "The dynamics of heat gelation of casein glycomacropeptide—β-lactoglobulin mixtures as affected by interactions in the aqueous phase." Int Dairy Journal,Sep. 2010, 20(9):580-588.
Product Data Sheet Simplesse 100 Whey Protein, Oct. 22, 2003, 3 pages.
Agave Juice, Wikipedia, 3 pages.
AVP LeanCreme, Microparticulation of Whey Protein with SPX Flow Technology, Dated Apr. 11, 2012, 28 pages.
Boland, "Whey Proteins." Handbook of Food Proteins, Chapter 3, Published 2011, 26 pages.
Declaration of Dr. Esra Cakir-Fuller, Mar. 13, 2019, 15 pages.
Dissertation of Marko Outlinen, "Effect of Pre-Treatment of Cheese Milk on the Composition and Characteristics of Whey and Whey Products." 2010, 86 pages.
Etzel, "Fractinating valuable peptides from whey." Dairy Pipeline, Wisconsin Center for Dairy Research, Dec. 2000, vol. 12, No. 4, 1 page.
Highly Profitable whey—LeanCreme process from SPX helps MS Iceland Dairies put excess when to best use. European Dairy Magazine 2012, 1 page.
Jingbo XU, "Impact of Casein Glycomacropeptide on Functional Properties of Whey Proteins" China excellent master's thesis full-text database, No. 6, 2009, pp. 53-61, Dec. 2009.
Koffi et al., "Storage stability and sensory analysis of UHT-processed whey-banana beverages." Journal of Food Quality, 2005,28(4): 386-401.
O'Loughlin et al., "Enzymatic Hydrolysis of Heat-induced Aggregates of Whey Protein Isolate." Teagase, 2012, 39 pages.
Matur, Oct. 2011.
Notice of Opposition filed against European Appl. No. 14789552.8 dated Jan. 11, 2019, 22 pages.
Notice of Opposition filed Mar. 7, 2019 against European Application No. 14789259.0, by N.V. Nutricia, 28 pages.
Notice of Opposition filed Mar. 13, 2019 against European Application No. 14789259.0, by Fonterra Co-Operative Group Limited, 28 pages.
Sharma et al., "Development of a protein fortified fruit beverage and its quality when processed with pulsed electric field treatment." J. Food Quality 2007, 21(6): 459-564.
Simplesse, Mircoparticulated Whey Protein Concentrate, CP Kelco (2010), p. 4.
Souci, Fackmann, Kraut, Food Composition and Nutrition Tables (7th Revised and Completed edition, 2008), Banana, p. 1106.
Souci, Fackmann, Kraut, Food Composition and Nutrition Tables (7th Revised and Completed edition, 2008), Orange Juice Concentrate, p. 1204.
Souci, Fackmann, Kraut, Food Composition and Nutrition Tables (7th Revised and Completed edition, 2008), Orange Juice, p. 1200.
Souci, Fackmann, Kraut, Food Composition and Nutrition Tables (7th Revised and Completed edition, 2008), Potato Starch, p. 737.
Souci, Fackmann, Kraut, Food Composition and Nutrition Tables (7th Revised and Completed edition, 2008), Tapioca Starch, p. 740.
Spiegel, "Whey protein aggregation under shear conditions—effects of lactose and heating temperature on aggregate size and structure." International Journal of Food Science and Technology 1999, 34: 523-531.
Ye et al., "Characterization of cold-set gels produced from heated emulsions stabilized by whey protein" International Dairy Journal, 2009, 19:721-727.
Office Action dated Dec. 16, 2019, in Indian Application No. 201617016324, 6 pages.
Xu, "Impact of Casein Glycomacropeptide on Functional Properties of Whey Proteins" China excellent master's thesis full-text database, Dec. 2009, Chapter 2, 14 pages.

* cited by examiner

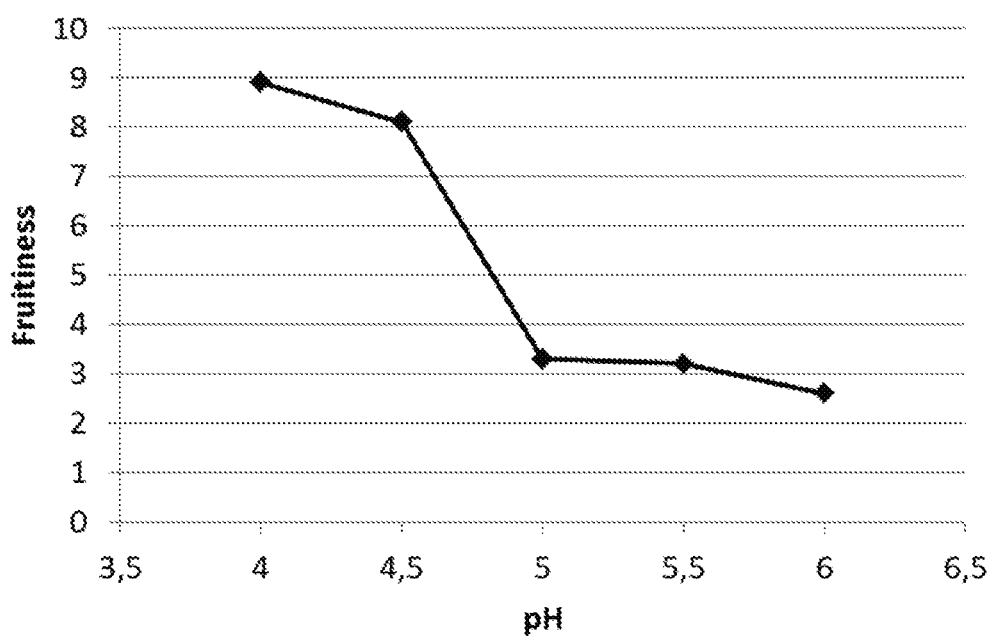

HIGH PROTEIN, FRUIT FLAVOURED BEVERAGE; HIGH PROTEIN, FRUIT AND VEGETABLE PREPARATION; AND RELATED METHODS AND FOOD PRODUCTS

CROSS-REFERENCE TO RELATED APPLICATIONS

This is a U.S. national stage entry of International Patent Application No. PCT/EP2014/072791, filed on Oct. 23, 2014, which claims priority to Denmark Patent Application No. PA 2013 70612, filed on Oct. 23, 2013, the entire contents of all of which are fully incorporated herein by reference.

FIELD OF THE INVENTION

The present invention pertains to a new type of high protein, fruit flavoured beverage comprising fruit flavouring agents and high protein denatured whey protein compositions, and to a method of producing the beverage. The invention particularly pertains to fruit flavoured beverages having a protein content of at least 4% (w/w). The invention furthermore relates to high protein fruit and/or vegetable preparations which e.g. are advantageous for the production of high protein, fruit- and/or vegetable-flavoured yoghurt. The invention also relates to food products containing the high protein fruit and/or vegetable preparations and to a method for producing these.

BACKGROUND

Denatured, microparticulated whey protein concentrates have for long been used as a food ingredient for the production of e.g. cheese or yoghurt. Traditionally, the products have been produced by heating a whey protein solution having a neutral to acidic pH to a protein denaturing temperature whereby whey protein gel is formed, and subsequently subjecting the gel to high shear conditions so as to convert the gel to microparticles, which can be converted to a powder by spray-drying.

U.S. Pat. No. 5,096,731 B2 discloses a yoghurt where all or part of the fat and/or oil of the yogurt is replaced with microparticulated protein comprising substantially non-aggregated particles of denatured protein having a mean diameter of 0.5-2 microns when in a dry state.

U.S. Pat. No. 6,605,311 B2 discloses insoluble, denatured, heat-stable protein particles having a mean diameter of 0.1-3 microns when in a hydrated state, which are dispersible in aqueous solutions and are used in food and beverage products. Example 12 of U.S. Pat. No. 6,605,311 B2 describes a ready-to-drink, juice-containing beverage containing approx. 1.5% (w/w) denatured whey protein.

SUMMARY OF THE INVENTION

The present inventors have found that it is challenging to prepare fruit and/or vegetable flavoured high protein dairy products, and particularly liquid dairy products, because the addition of conventional fruit preparation, which normal has a low protein content, dilutes the protein content of the other ingredients. Fruit-flavoured yoghurt is conventionally prepared by producing a non-flavoured acidified white base which is then mixed with the fruit preparation. If a high protein white base is to be used (containing e.g. 10% (w/w) total protein) and is to be mixed with a conventional fruit preparation (containing e.g. 0.5% (w/w) total protein) in the proportion 2 parts white base to 1 part fruit preparation, the resulting fruit-flavoured yoghurt would only have a total protein content of approx. 6.8% (w/w).

The present inventors have invented a new type of fruit preparation (or fruit and/or vegetable preparation) which contains a significant amount of protein in addition to the fruit material that is normally present in the preparation. Examples of the preparation of high protein fruit preparations are described in Examples 4-5.

Example 6-7 demonstrate that it is possible to prepare a high protein, fruit-flavoured dairy product without diluting the protein content of the white yoghurt base—which would not be the case if conventional pectin-based fruit preparation was used. The examples furthermore demonstrate that the high protein fruit preparation can be used to give the final yoghurt product a higher protein content than that of the white base.

Thus, an aspect of the invention pertains to a heat-treated, high protein fruit and/or vegetable preparation suitable for the production of fruit- and/or vegetable-flavoured yoghurt, the fruit and/or vegetable preparation comprising:
  a fruit and/or vegetable material in an amount of at least 10% (w/w)
  insoluble protein particles having a particle size in the range of 1-10 micron in an amount of at least 2% (w/w),
  the fruit and/or vegetable preparation having a total solids content in the range of 15-80% (w/w).

Yet an aspect of the invention pertains to a method of producing the high protein fruit and/or vegetable preparation, the method comprising the steps of:
  1) providing:
  a fruit and/or vegetable material,
  insoluble protein particles having a particle size in the range of 1-10 micron, and
  optionally, one or more additional ingredients,
  2) combining the fruit and/or vegetable material, the insoluble protein particles having a particle size in the range of 1-10 micron, and optionally also the one or more additional ingredients to obtain a mixture wherein the fruit and/or vegetable material is present in an amount of at least 10% (w/w) and wherein the insoluble whey protein particles having a particle size in the range of 1-10 micron are present in an amount of at least 2% (w/w), and
  3) heat-treating the mixture of step 2) thereby obtaining the heat-treated high protein fruit and/or vegetable preparation.

Another aspect of the invention pertains to a food product comprising the heat-treated, high protein fruit and/or vegetable preparation as defined herein.

An more specific aspect of the invention relates to a high protein acidified dairy product comprising at least 4% (w/w) protein, said high protein acidified dairy product comprising the heat-treated, high protein fruit and/or vegetable preparation as defined herein.

Another aspect of the invention pertains to a high protein, fruit-flavoured beverage containing:
  water,
  a sweetener,
  a total amount of protein of at least 4% (w/w),
  a total amount of the solids of a denatured whey protein composition of at least 2% (w/w) relative to the total weight of the beverage, the denatured whey protein composition containing:
    a total amount of protein of at least 60% (w/w) on a dry weight basis relative to the total weight of the denatured whey protein composition, insoluble whey protein particles having a particle size in the range of 1-10 micron, where the amount of said insoluble whey protein particles is in the range of 50-100% (w/w) relative to the total amount of protein of the denatured whey protein composition, a fruit flavouring agent, and a food acid, said beverage having a pH in the range of 3.0-4.8.

The present inventors have found that a high protein beverage containing a mixture of fruit juice and a substantial amount of a denatured whey protein composition that has both an acceptable taste and acceptable textural properties can be produced by replacing a 45% (w/w) protein (microparticulated WPC45) with a denatured whey protein composition containing at least 60% protein, and by carefully controlling the pH of the beverage.

It should furthermore be noted that the high protein, fruit-flavoured beverage may be used as a high protein fruit preparation.

Yet an aspect of the invention pertains to a method of producing a high protein, fruit-flavoured beverage, the method comprising:

a) forming a mixture comprising:
water,
sweetener,
a total amount of protein of at least 4% (w/w)
a total amount of solids of a denatured whey protein composition of at least 2% (w/w) relative to the total weight of the beverage, the denatured whey protein composition containing:
  a total amount of protein of at least 60% (w/w) relative to the total weight of the partly denatured whey protein composition,
  insoluble whey protein particles having a particle size in the range of 1-10 micron, where the amount of said insoluble whey protein particles is in the range of 50-100% (w/w) relative to the total amount of the denatured whey protein composition,
a fruit flavouring agent, and
food acid b) optionally, if the pH of the mixture is higher than pH 4.8, reducing the pH of the mixture to a pH in the range of 3.0-4.8 by addition of a food acid, and c) packaging the mixture, wherein:

i) the mixture is heat-treated prior to, during or after packaging, or ii) the mixture is made of one or more heat-treated ingredients.

BRIEF DESCRIPTION OF THE FIGURE

FIG. 1 shows the relationship between the pH of the beverage sample and the perceived fruitiness of the sample.

DETAILED DESCRIPTION OF THE INVENTION

The present invention relates to a high protein, fruit-flavoured beverage containing:
water,
a sweetener,
a total amount of protein of at least 4% (w/w),
a total amount of the solids of a denatured whey protein composition of at least 2% (w/w) relative to the total weight of the beverage, the denatured whey protein composition containing:
  a total amount of protein of at least 60% (w/w) on a dry weight basis relative to the total weight of the denatured whey protein composition,
  insoluble whey protein particles having a particle size in the range of 1-10 micron, where the amount of said insoluble whey protein particles is in the range of 50-100% (w/w) relative to the total amount of protein of the denatured whey protein composition,
a fruit flavouring agent, and
a food acid,
said beverage having a pH in the range of 3.0-4.8.

In the context of the present invention, the term "dry weight" of a composition or a beverage relates to the weight of the composition or beverage if it had been dried to a water content of 3% (w/w) water.

The contents of the water in the beverage can be determined according to Example 1.7.

In one embodiment, the high protein, fruit-flavoured beverage is ready to be ingested and has a water content of at least 75% relative to the total weight of the beverage, and the total dry weight of the beverage is typically at most 25% (w/w) relative to the total weight of the beverage. For example, the beverage may have a water content of at least 85% relative to the total weight of the beverage, and the total dry weight of the beverage is typically at most 15% (w/w) relative to the total weight of the beverage.

The high protein, fruit-flavoured beverage may take the form of a concentrate, or may be dried to a powder, to which water is added to provide a beverage that is ready to be ingested.

Thus, an alternative aspect of the invention relates to a dry powder containing the nonwater-components of the high protein, fruit-flavoured beverage, and which powder contains at most 6% (w/w) water.

The term "sweetener" relates to a component of the beverage that confers a sweet taste when the beverage is ingested. Components suitable for conferring a sweet taste may be natural sweeteners or artificial sweeteners. Suitable natural sweeteners include both sugars in the form of sugars (i.e. mono- and di-saccharides) and non-sugar sweeteners.

The sweetener, in the form of one or more mono- and/or di-saccharide(s), may be a native component of the denatured whey protein composition and/or the fruit-flavouring agent in the beverage. In addition to the native sweetener content of the whey protein composition and/or fruit-flavouring agent, the beverage may contain a first sweetener component comprising one of more additional di- and mono-saccharides in order to provide the desired sweet taste.

In the context of the present invention, the phrase "Y and/or X" means "Y" or "X" or "Y and X". Along the same line of logic, the phrase "$n_1, n_2, \ldots, n_{i-1}$, and/or $n_i$" means "$n_1$" or "$n_2$" or ... or "$n_{i-1}$" or "$n_i$" or any combination of the components: $n_1, n_2, \ldots n_{i-1}$, and $n_i$.

The sweetener, in the form of one or more mono- and/or di-saccharide(s), may be derived from mammalian milk or a derivative thereof. A suitable source of milk-derived saccharides includes whole milk, semi-skimmed milk, skimmed milk, whey, milk permeate and milk permeate solids. The main form of milk-derived saccharides is lactose and/or glucose and galactose.

In one embodiment, the food product may contain one of more additional carbohydrates in the form of di- and mono-saccharides such as sucrose, maltose, lactose, dextrose, glucose, fructose, galactose and a combination thereof that provide both nutritional energy and a sweet taste when the food product is ingested.

In one embodiment, the high protein, fruit-flavoured beverage comprises a total amount of sweetener in the range of 1-80% (w/w) relative to the dry weight of the beverage. In a further embodiment, the beverage comprises a first sweetener component in addition to the native sweetener in the denatured whey protein composition, where the amount of the first sweetener is in the range of 1-80% (w/w) relative to the dry weight of the beverage. Preferably, the first sweetener is in the form of di- and mono-saccharides; more preferably in the form of a lactose-containing or lactose-derived carbohydrate, in particular lactose, glucose and galactose. The first sweetener may comprise a total amount of di- and mono-saccharides of at least 75% (w/w) relative to the dry weight of the first sweetener; or in an amount of at least 80% (w/w) relative to the dry weight of the first sweetener, such as in the range of 85-95% (w/w) relative to the dry weight of the first sweetener, where the total amount of di- and mono-saccharides is preferably the sum of the amount of lactose, glucose and galactose.

In one embodiment, the high protein, fruit-flavoured beverage comprises a total amount of carbohydrate sweetener in the range of 1-20% (w/w) relative to the total weight of the beverage to be ingested. Alternatively, the beverage may comprise a total amount of carbohydrate sweetener in the range of 4-15% (w/w) relative to the total weight of the beverage to be ingested. Since the denatured whey protein composition and/or the fruit-flavouring agent in the beverage may comprise sweetener components, it will often be sufficient to add carbohydrate sweetener in an amount of about 2-10% relative to the total weight of the beverage to be ingested to reach the desired sweetness of taste. Alternatively, the beverage may comprise a total amount of added carbohydrate sweetener in the range of 4-8% (w/w) relative to the total weight of the beverage to be ingested.

A high protein, fruit-flavoured beverage containing the denatured whey protein composition may further comprise one or more non-carbohydrate natural or artificial sweeteners.

In one embodiment, the high protein, fruit-flavoured beverage contains one or more natural sweetening agent(s) that are not sugars. These natural sweetening agent(s) may be provided as a component of a second sweetener, either alone or in combination with a natural sugar sweetener, as defined above. The natural non-sugar sweetening agent(s) may for example be selected from the group consisting of Momordica Grosvenorii (Mogrosides IV or V) extracts, Rooibos extracts, Honeybush extracts, Stevia extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, isomaltulose, and/or natural polyols such as maltitol, mannitol, lactitol, sorbitol, inositol, xylitol, threitol, galactitol and combinations thereof.

In one embodiment, the high protein, fruit-flavoured beverage contains one or more artificial sweetening agent(s). These artificial sweetening agent(s) may be provided as a component of the first sweetener, either alone or in combination with other of the sweeteners, as defined above. The artificial non-sugar sweetening agent(s) may for example be selected from the group consisting of Aspartame, Cyclamate, Sucralose, Acesulfame K, neotame, Saccharin, Neohesperidin dihydrochalcone, Stevia extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), and combinations thereof.

In some embodiments of the invention, it is particularly preferred that the sweetener, comprises or even consists of, one or more high intensity sweeteners (HIS). HIS are both found among the natural and the artificial sweeteners and typically have a sweetening intensity of at least 10 times that of sucrose. Non-limiting examples of useful HIS are Aspartame, Cyclamate, Sucralose, Acesulfame K, neotame, Saccharin, Neohesperidin dihydrochalcone and combinations thereof.

If used, the total amount of HIS is typically in the range of 0.01-2% (w/w). For example, the total amount of HIS may be in the range of 0.05-1.5% (w/w). Alternatively, the total amount of HIS may be in the range of 0.1-1.0% (w/w).

It may furthermore be preferred that sweetener, comprises or even consists of, one or more polyol sweetener(s). Non-limiting examples of useful polyol sweetener are maltitol, mannitol, lactitol, sorbitol, inositol, xylitol, threitol, galactitol or combinations thereof.

If used, the total amount of polyol sweetener is typically in the range of 1-20% (w/w). For example, the total amount of polyol sweetener may be in the range of 2-15% (w/w). Alternatively, the total amount of polyol sweetener may be in the range of 4-10% (w/w).

The high protein fruit-flavoured beverage of the invention has a total protein content of at least 4% (w/w) relative to the total weight of the beverage. In one embodiment, the beverage has a total protein content of at least 5% (w/w); preferably at least 6% (w/w); more preferably at least 8% (w/w) relative to the total weight of the beverage.

The denatured whey composition in the beverage is a major component of the protein content of the beverage. The denatured whey composition comprises a total amount of protein of at least 60% (w/w) on a dry weight basis relative to the total weight of the denatured whey protein composition, and comprises an insoluble whey protein particles having a particle size in the range of 1-10 micron, where the amount of said insoluble whey protein particles is in the range of 50-100% (w/w) relative to the total amount of protein of the denatured whey protein composition.

In the context of the present invention, the term "denatured whey protein composition" relates to a composition which contains at least some denatured whey protein and preferably a significant amount of denatured whey protein. The composition may also contain some non-denatured whey protein; however, the protein of the denatured whey protein composition preferably has a degree of denaturation of at least 50%.

In one embodiment, the protein of the denatured whey protein composition in the beverage of the invention may have a degree of denaturation of at least 60%. The protein of denatured whey protein composition may e.g. have a degree of denaturation of at least 70%, such at least 75%. Alternatively, the protein of denatured whey protein composition may have a degree of denaturation of at least 80%.

Even higher degrees of denaturation may be desirable, thus, the protein of denatured whey protein composition may have a degree of denaturation of at least 85%. For example, the protein of denatured whey protein composition may have a degree of denaturation of at least 90%. The protein of denatured whey protein composition may e.g. have a degree of denaturation of at least 95% such at least 97%. Alternatively, the protein of denatured whey protein composition may have a degree of denaturation of at least 99%.

In the context of the present invention, the term "whey protein" relates to the proteins which are present in the serum phase of either milk or coagulated milk. The proteins of the serum phase of milk are also sometimes referred to as milk serum proteins or ideal whey.

In the context of the present invention, the term "whey" relates to the liquid composition which is left when casein has been removed from milk. Casein may e.g. be removed by microfiltration providing a liquid permeate which is free of or essentially free of micellar casein but contains the native whey proteins. This liquid permeate is sometimes referred to as ideal whey, serum or milk serum.

Alternatively, the casein may be removed from milk by contacting a milk composition with rennet enzyme, which cleavage of kappa-casein into para-kappa-casein and the peptide caseinomacropeptide (CMP), thereby destabilising the casein micelles and causing casein to precipitate. The liquid surrounding the rennet precipitated casein is often referred to as sweet whey and contains CMP in addition to the whey proteins which are normally found in milk.

Casein may also be removed from milk by acid precipitation, i.e. reducing the pH of the milk below pH 4.6 which is the isoelectric point of casein and which causes the casein micelles to disintegrate and precipitate. The liquid surrounding the acid precipitated casein is often referred to as acid whey or casein whey and does not contain CMP.

In the context of the present invention the term "insoluble whey protein particles" pertains to particulate aggregates comprising denatured whey proteins, which aggregate and can be separated from soluble whey protein by centrifugation.

The denatured whey protein composition contains insoluble whey protein particles and preferably a substantial part of the insoluble particles have a particle size in the range of 1-10 micron. The insoluble whey protein particles are typically produced by heating a solution of whey protein at an appropriate pH while subjecting the solution to a high degree of internal shear. The shear may be provided by mechanical shearing, using e.g. scraped-surface heat-exchangers or homogenizers or by subjecting the solution to high linear flow rates which promote turbulence.

It is also possible to prepare the denatured whey protein compositions using low shear or non-shear microparticulation methods. Such methods typically involve the use relatively low concentrations of whey protein during heat treatment and precise control of the pH and the concentration of calcium.

Insoluble whey protein particles having a particle size in the range of 1-10 micron are interesting for the present invention, and in some preferred embodiments, the denatured whey protein composition comprises insoluble whey protein particles in this size range in an amount of at least 50% (w/w) relative to the total amount of protein of the composition.

The amount (% w/w relative to the total amount of protein) of insoluble whey protein particles having a particle size in the range of 1-10 micron in a denatured whey protein composition is determined according to Example 1.1 ($P_{1-10}$).

For example, the denatured whey protein composition may comprise insoluble whey protein particles having a particle size in the range of 1-10 micron in an amount of at least 60% (w/w) relative to the total amount of protein of the composition. The particle size range 1-10 micron effectively covers particles having a particle size (hydrodynamic diameter) as low as 0.5000 micron and as high as 10.4999 micron.

The denatured whey protein composition may e.g. comprise insoluble whey protein particles having a particle size in the range of 1-10 micron in an amount of at least 65% (w/w) relative to the total amount of protein of the composition. Alternatively, the denatured whey protein composition may comprise insoluble whey protein particles having a particle size in the range of 1-10 micron in an amount of at least 70% (w/w) relative to the total amount of protein of the composition. The denatured whey protein composition may for example comprise insoluble whey protein particles having a particle size in the range of 1-10 micron, in an amount of at least 75% (w/w) relative to the total amount of protein of the composition, such as in an amount of at least 80% (w/w).

A higher content of insoluble whey protein particles having a particle size in the range of 1-10 micron may be preferred for some applications. Thus, the denatured whey protein composition may comprise insoluble whey protein particles having a particle size in the range of 1-10 micron in an amount of at least 85% (w/w) relative to the total amount of protein of the composition. The denatured whey protein composition may e.g. comprise insoluble whey protein particles having a particle size in the range of 1-10 micron in an amount of at least 88% (w/w) relative to the total amount of protein of the composition. Alternatively, the denatured whey protein composition may comprise insoluble whey protein particles having a particle size in the range of 1-10 micron in an amount of at least 90% (w/w) relative to the total amount of protein of the composition, such as in an amount of at least 95% (w/w) or approx. 100% (w/w).

In some embodiments of the invention, the denatured whey protein composition may comprise insoluble whey protein particles having a particle size in the range of 1-10 micron in an amount in the range of 50-100% (w/w) relative to the total amount of protein of the composition. The denatured whey protein composition may e.g. comprise insoluble whey protein particles having a particle size in the range of 1-10 micron in an amount in the range of 60-95% (w/w) relative to the total amount of protein of the composition. Alternatively, the denatured whey protein composition may comprise insoluble whey protein particles having a particle size in the range of 1-10 micron in an amount in the range of 65-90% (w/w) relative to the total amount of protein of the composition. The denatured whey protein composition may for example comprise insoluble whey protein particles having a particle size in the range of 1-10 micron in an amount in the range of 70-85% (w/w) relative to the total amount of protein of the composition.

Insoluble whey protein particles having a particle size of approx. 1 micron are of particular interest for the present invention, and in some preferred embodiments the denatured whey protein composition comprises insoluble whey protein particles within this size range in an amount of at least 50% (w/w) relative to the total amount of protein of the composition. The particle size of approx. 1 micron effectively covers particles having a particle size (hydrodynamic diameter) as low as 0.5000 micron and as high as 1.4999 micron. The amount (% w/w relative to the total amount of protein) of insoluble whey protein particles having a particle size of approx. 1 micron in a denatured whey protein composition is determined according to Example 1.1 ($P_1$).

For example, the denatured whey protein composition may comprise insoluble whey protein particles having a particle size of approx. 1 micron in an amount of at least 55% (w/w) relative to the total amount of protein of the composition. The denatured whey protein composition may e.g. comprise insoluble whey protein particles having a particle size of approx. 1 micron in an amount of at least 60% (w/w) relative to the total amount of protein of the composition. Alternatively, the denatured whey protein composition may comprise insoluble whey protein particles having a particle size of approx. 1 micron in an amount of at least 70% (w/w) relative to the total amount of protein of the composition. The denatured whey protein composition may for example comprise insoluble whey protein particles having a particle size of approx. 1 micron in an amount of at least 75% (w/w) relative to the total amount of protein of the composition, such as in an amount of at least 80% (w/w).

A higher content of insoluble whey protein particles having a particle size of approx. 1 micron may be preferred for some applications. Thus, the denatured whey protein composition may comprise insoluble whey protein particles having a particle size of approx. 1 micron in an amount of at least 85% (w/w) relative to the total amount of protein of the composition. The denatured whey protein composition may e.g. comprise insoluble whey protein particles having a particle size of approx. 1 micron in an amount of at least 90% (w/w) relative to the total amount of protein of the composition. Alternatively, the denatured whey protein composition may comprise insoluble whey protein particles having a particle size of approx. 1 micron in an amount of at least 95% (w/w) relative to the total amount of protein of the composition, such as in an amount of at least 97% (w/w) or approx. 100% (w/w).

In some embodiments of the invention, the denatured whey protein composition may comprise insoluble whey protein particles having a particle size of approx. 1 micron in an amount in the range of 50-100% (w/w) relative to the total amount of protein of the composition. The denatured whey protein composition may e.g. comprise insoluble whey protein particles having a particle size of approx. 1 micron in an amount in the range of 60-95% (w/w) relative to the total amount of protein of the composition. Alternatively, the denatured whey protein composition may comprise insoluble whey protein particles having a particle size of approx. 1 micron in an amount in the range of 65-90% (w/w) relative to the total amount of protein of the composition. The denatured whey protein composition may for example comprise insoluble whey protein particles having a particle size of approx. 1 micron in an amount in the range of 70-85% (w/w) relative to the total amount of protein of the composition.

For example, the denatured whey protein composition may comprise insoluble whey protein particles having a particle size of approx. 1 micron in an amount in the range of 55-85% (w/w) relative to the total amount of protein of the composition. The denatured whey protein composition may e.g. comprise insoluble whey protein particles having a particle size of approx. 1 micron in an amount in the range of 60-85% (w/w) relative to the total amount of protein of the composition. Alternatively, the denatured whey protein composition may comprise insoluble whey protein particles having a particle size of approx. 1 micron in an amount in the range of 65-85% (w/w) relative to the total amount of protein of the composition. The denatured whey protein composition may for example comprise insoluble whey protein particles having a particle size of approx. 1 micron in an amount in the range of 65-80% (w/w) relative to the total amount of protein of the composition.

Larger particles of insoluble whey protein are often less desirable as they may give rise to a sandy texture of the food products incorporating the denatured whey protein compositions.

Thus, in some preferred embodiments of the invention, the denatured whey protein composition comprises insoluble whey protein particles having a particle size of more than 10 micron in an amount of at most 10% (w/w) relative to the total amount of protein of the composition, preferably at most 5% (w/w), and even more preferably at most 1% (w/w).

For example, the denatured whey protein composition comprises insoluble whey protein particles having a particle size of more than 10 micron in an amount of at most 10% (w/w) relative to the total amount of protein of the composition, preferably at most 5% (w/w), and even more preferably at most 1% (w/w).

Additionally, it is sometimes preferred that the amount of insoluble whey protein particles having a size below 0.5 micron is kept to a minimum as these may provide an undesirably high viscosity to the products comprising them.

Thus, in some embodiments of the invention, the denatured whey protein composition comprises insoluble whey protein particles having a particle size of less than 0.5 micron in an amount of at most 10% (w/w) relative to the total amount of protein of the composition, preferably at most 5% (w/w), and even more preferably at most 1% (w/w).

In some preferred embodiments of the invention, the denatured whey protein composition comprises:
- insoluble whey protein particles having a particle size in the range of 1-10 micron in an amount of at least 50% (w/w) relative to the total amount of protein of the composition,
- insoluble whey protein particles having a particle size of more than 10 micron in an amount of at most 10% (w/w) relative to the total amount of protein of the composition, and
- insoluble whey protein particles having a particle size of less than 0.5 micron in an amount of at most 10% (w/w) relative to the total amount of protein of the composition.

For example, the denatured whey protein composition comprises:
- insoluble whey protein particles having a particle size in the range of 1-10 micron in an amount of at least 50% (w/w) relative to the total amount of protein of the composition,
- insoluble whey protein particles having a particle size of more than 10 micron in an amount of at most 5% (w/w) relative to the total amount of protein of the composition, and
- insoluble whey protein particles having a particle size of less than 0.5 micron in an amount of at most 10% (w/w) relative to the total amount of protein of the composition.

Alternatively, the denatured whey protein composition may comprise:
- insoluble whey protein particles having a particle size in the range of 1-10 micron in an amount of at least 50% (w/w) relative to the total amount of protein of the composition,
- insoluble whey protein particles having a particle size of more than 10 micron in an amount of at most 1% (w/w) relative to the total amount of protein of the composition, and insoluble whey protein particles having a particle size of less than 0.5 micron in an amount of at most 10% (w/w) relative to the total amount of protein of the composition.

The particle size distribution of the insoluble whey protein particles is using the procedure outlined in Example 1.1.

In one embodiment, the denatured whey composition comprised in the beverage, has a total protein content of at least 70% (w/w) relative to denatured whey composition on a dry weight basis; preferably at least 80% (w/w); more preferably at least 90% (w/w); such as in the range of 85% to 90% (w/w).

The term "solids" relates to solids of the denatured whey protein composition that would be left if all water of the composition was completely removed, i.e. the non-volatile components of the denatured whey protein composition including proteins, lipids, carbohydrates and milk minerals. The solid content of a food product is preferably determined according to Example 1.7.

It should be noted that the denatured whey protein solids need not be in solid form, but rather parts of it may present in dissolved form in the beverage.

While the high protein, fruit-flavoured beverage contains a total amount of the solids of a denatured whey protein composition of at least 2% (w/w) relative to the total weight of the beverage, it is often preferred that the denatured whey protein composition is used at even higher concentrations. For examples, the beverage may contain the solids of the denatured whey protein composition in an amount of at least 4% (w/w). The beverage may e.g. contain the solids of the denatured whey protein composition in an amount of at least 6% (w/w). Alternatively, the beverage may contain the solids of the denatured whey protein composition in an amount of at least 8% (w/w). The beverage may e.g. contain the solids of the denatured whey protein composition in an amount of at least 10% (w/w) or even in an amount of at least 15% (w/w).

The high protein, fruit-flavoured beverage typically contains the solids of the denatured whey protein composition in an amount in the range of 2-15% (w/w). For example, the beverage may contain the solids of the denatured whey protein composition in an amount in the range of 4-12% (w/w). The beverage may e.g. contain the solids of the denatured whey protein composition in an amount in the range of 5-10% (w/w). Alternatively, the high protein food product may contain the solids of the denatured whey protein composition in an amount in the range of 3-6% (w/w).

The denatured whey protein composition contained in the beverage may be provided in the form of a powder, preferably having a water content of at most 6% (w/w), or as an aqueous suspension composition, preferably comprising at least 50% (w/w) water.

In one embodiment, the beverage contains less than 5% casein relative to the total amount of protein.

The high protein, fruit-flavoured beverage may contain one or more minerals.

The present inventors have found that it is advantageous to reduce the amount of minerals (measured as the ash content) of the denatured whey protein composition used to prepare the beverage. While not wishing to be bound by theory, it is thought that previous attempts to produce high protein, fruit-flavoured beverages using denatured whey protein compositions as a source of protein, have resulted in beverages with poor flavor due to a failure to control the levels of salt and lactose in the product when the protein levels of the beverage are enriched by adding whey protein fraction.

In some preferred embodiments of the invention, the denatured whey protein composition has a total protein:ash content weight ratio of at least 15. Preferably, the total protein:ash content weight ratio of the denatured whey protein composition is at least 20. Even more preferably, the total protein:ash content weight ratio of the denatured whey protein composition is at least 30. For example, the total protein:ash content weight ratio of the denatured whey protein composition may be at least 40, such as at least 50.

For example, the denatured whey protein composition may have a total protein:ash content weight ratio in the range of 15-60. The denatured whey protein composition may e.g. have a total protein:ash content weight ratio in the range of 20-55. Alternatively, the denatured whey protein composition may have a total protein:ash content weight ratio in the range of 25-50, such as in the range of 30-45.

The ash content is determined according to example 1.6 and the total protein is determined according to Example 1.4.

The one of more minerals may be selected from the group consisting of phosphorus, magnesium, iron, zinc, manganese, copper, chromium, iodine, sodium, potassium, chloride and combinations thereof.

The one or more minerals are typically a native component of the denatured whey protein composition, such that the mineral content of the beverage will be determined by the denatured whey protein composition in the beverage. A beverage containing the denatured whey protein composition typically has a total ash content in the range of 1-10% (w/w) relative to the dry weight of the beverage; preferably in the range of 3-8% (w/w), more preferably in the range of 4-6% (w/w) relative to the dry weight of the beverage.

In addition to salts and minerals, the denatured whey protein composition furthermore typically contains fat, e.g. milk fat or whey fat. For example, the denatured whey protein composition may furthermore comprise fat in an amount of at most 8% (w/w) on a dry weight basis.

The denatured whey protein composition may furthermore comprise carbohydrate, typically in the form of lactose or lactose-based oligosaccharides. For example, the denatured whey protein composition may comprise lactose in an amount of at most 30% (w/w) on a dry weight basis. The denatured whey protein composition may e.g. comprise lactose in an amount of at most 15% (w/w) on a dry weight basis. Alternatively, the denatured whey protein composition may comprise lactose in an amount of at most 10% (w/w) on a dry weight basis.

In some preferred embodiments of the invention, the lactose content of the denatured whey protein composition is even lower, such as at most 4% (w/w) on a dry weight basis. Preferably, the lactose content of the denatured whey protein composition is at most 3% (w/w) on a dry weight basis. Even more preferably, the lactose content of the denatured whey protein composition is at most 2% (w/w) on a dry weight basis, such as at most 1% (w/w).

The present inventors have found that such compositions are particularly advantageous for preparing high protein, low lactose food products or high protein, low carbohydrate food products.

The denatured whey protein composition may be present in different forms. For example the denatured whey protein composition may be a powder, preferably a dry powder. In the context of the present invention, a dry powder contains at most 6% (w/w) water.

Alternatively, the denatured whey protein composition may be a suspension and preferably an aqueous suspension, meaning that the insoluble particles of the denatured whey protein composition are suspended in water. In the context of the present invention, an aqueous suspension contains at least 50% (w/w) water, preferably at least 60% (w/w) water, such as at least 70% (w/w). Even higher contents of water may be preferred for some applications, thus, an aqueous suspension may contain at least 80% (w/w) water, such as e.g. at least 90% (w/w) water.

The contents of water in a food product may be determined according to ISO 5537:2004 (Dried milk—Determination of moisture content (Reference method)) or by NMKL 110 $2^{nd}$ Edition, 2005 (Total solids (Water)—Gravimetric determination in milk and milk products). NMKL is an abbreviation for "Nordisk Metodikkomité for Næringsmidler".

In the context of the present invention, the term "dry weight" of a composition or product relates to the weight of the composition or product when it has been dried to a water content of 3% (w/w) water.

The high protein, fruit-flavoured beverage comprises one or more natural and/or artificial fruit flavouring agent. The fruit flavouring agent may be selected from orange flavour, lemon flavour, lime flavour, pineapple flavour, apple flavour, pear flavour, strawberry flavour, cherry flavour, cranberry flavor, blackcurrant flavour and grape fruit flavor. In one embodiment, the fruit flavouring agent comprises or even consists of a juice or a juice concentrate or one or more fruits. Typically, the beverage comprises between 5 and 80% (w/w) of a fruit flavouring agent. When the fruit flavouring agent is provided as a concentrate of the pure juice of one or more fruits, this concentrate comprises lower amounts, such as in the range of 1-20% (w/w), of the beverage to be ingested. In one embodiment, the concentrate comprises amounts in the range of 2-15% (w/w) of the beverage, such as in the range of 2-10-% (w/w). When the fruit flavouring agent is provided as a non-concentrate of pure juice of one or more fruits, this juice may comprise amounts in the range of 5-85% (w/w) of the beverage to be ingested. In one embodiment, the pure juice comprises amounts in the range of 10-50% (w/w) of the beverage, or alternatively in the range of 15-40% (w/w) or 20-30%.

The high protein, fruit-flavoured beverage comprises one or more food acids. The term "food acid" includes both acidic, partly deprotonated and fully deprotonated forms of the acid.

In one embodiment, the beverage comprises a food acid selected from the group consisting of citric acid, malic acid, tartaric acid, acetic acid, benzoic acid, butyric acid, lactic acid, fumaric acid, succinic acid, ascorbic acid, adipic acid, phosphoric acid and mixtures thereof. In a further embodiment, some or substantially all of the food acid in the beverage is provided by the fruit flavouring agent.

The total amount of food acid in the beverage may be at least 0.1% (w/w) relative to the total weight of the beverage, preferably at least 0.5% (w/w), more preferably at least 0.75% (w/w); even more preferably at least 1.0% (w/w) relative to the total weight of the beverage.

In a further embodiment, the beverage has a total food acid content in the range of 0.2%-5% (w/w) relative to the total weight of the beverage, more preferably in the range of 0.3-3.0 (w/w), even more preferably in the range of 0.5%-1.5% (w/w) relative to the total weight of the beverage.

These total amounts of food acids in the beverage correspond to the sum of food acid, including both acidic, partly deprotonated and fully deprotonated forms of the food acid.

In one embodiment, the high protein, fruit-flavoured beverage may further comprise one or more vitamin(s) such as vitamin A, vitamin D, vitamin E, vitamin K, thiamine, riboflavin, pyridoxine, vitamin B12, niacin, folic acid, pantothenic acid, biotin, vitamin C, choline, inositol, their salts, their derivatives, and combinations thereof.

In one embodiment, the high protein, fruit-flavoured beverage may further comprise one of more stabilizers. Suitable stabilizers include locust bean gum, guar gum, alginates, cellulose, xanthan gum, carboxymethyl cellulose, microcrystalline cellulose, carrageenans, pectins and mixtures thereof.

The content of the one of more stabilisers may be in the range of 0.01-3% (w/w) relative to the dry weight of the beverage, preferably in the range of 0.1 to 0.5% (w/w).

In one embodiment, the high protein, fruit-flavoured beverage may further comprise one of more emulsifiers. Suitable emulsifiers to be used are mono- and di-glycerides, citric acid esters of mono- and di-glycerides, diacetyltartaric acid esters of mono- and di-glycerides polysorbate, lecithin, or polyol esters of fatty acids such as propylene glycol monoester of fatty acids, or mixtures thereof.

The content of the one of more emulsifiers may be in the range of 0.01-3% (w/w) relative to the dry weight of the beverage, preferably in the range of 0.1 to 0.5% (w/w).

The high protein, fruit-flavoured beverage has a pH in the range of 3.0-4.8 when measured at 25 degrees C., where the pH of the beverage can be adjusted within this range by the addition of food acid.

The high protein, fruit-flavoured beverage may be a heat-treated beverage, where the temperature of the beverage has preferably been raised to at least 70° C. for sufficient time to pasteurize the beverage. In a preferred embodiment, the high protein, fruit-flavoured beverage contains at most $10^6$ viable bacteria per mL, more preferably the beverage is sterile or at least commercially sterile.

In one embodiment, the high protein, fruit-flavoured beverage preferably has a viscosity in the range of 3-400 cP. The high protein, fruit-flavoured beverage may for example have a viscosity of at most 400 cP, and typically in the range of 4-350 cP. For example, the viscosity of the high protein, fruit-flavoured beverage may be in the range of 10-300 cP. The viscosity of the high protein, fruit-flavoured beverage may e.g. be in the range of 15-200 cP. Alternatively, the viscosity of the high protein, fruit-flavoured beverage may be in the range of 20-150 cP, such as in the range of 50-130 cP.

The food product containing the denatured whey protein composition can be produced in a number of different ways. The denatured whey protein composition may for example be added as a dry ingredient during the production of the food product or it may be added in the form of a suspension during the production.

When the denatured whey protein composition is used in the form of powder, it is often preferred to resuspend the denatured whey protein composition powder in an aqueous liquid, e.g. water or milk, and give it time to rehydrate, e.g. 10 minutes-1 hour, before continuing the processing. However, the general process may already inherently give the denatured whey protein composition powder sufficient time for rehydration in which case extra rehydration time is not necessary.

The insoluble whey protein particles are typically produced by heating a solution of whey protein having an appropriate pH while subjecting the solution to a high degree of internal shear or by adjusting the conditions of the solution so that particles build up without the generation of a continuous gel in the solution. The shear may be provided by mechanical shearing, using e.g. scraped-surface heat-exchangers or homogenizers, or by subjecting the solution to flow conditions which promote turbulence.

The invention provides the following method for producing a denatured whey protein composition, the method comprising the steps of:

a) providing a solution comprising whey protein, said solution having a pH in the range of 5-8, said solution comprising:
water,
a total amount of whey protein of at least 1% (w/w)
a total amount of protein of at least 60% (w/w) on a dry weight basis,
b) heating said solution to a temperature in the range of 70-160 degrees C. and keeping the temperature of the solution within this range for sufficient time to form insoluble whey protein microparticles having a particle size in the range of 1-10 micron,
c) optionally, cooling the heat-treated solution,
d) optionally, converting the heat treated solution to a powder,
wherein at least step b) involves subjecting the solution to mechanical shear.

The method may comprise the steps a) and b), and c), and d) in which case the denatured whey protein composition is a powder, and preferably a dry powder.

The method may comprise the steps a) and b), and d) but not step c) in which case the heat-treated solution is subjected to powder conversion without prior cooling.

The method may comprise the steps a) and b), and c) but not step d) in which case the denatured whey protein composition could be a suspension containing insoluble whey protein particles.

The whey protein solution typically contains a total amount of whey protein of at least 1% (w/w) relative to the weight of the solution, such as e.g. at least 5% (w/w). For example, the solution may contain a total amount of whey protein of at least 10% (w/w). The solution may e.g. contain a total amount of whey protein of at least 15% (w/w). Alternatively, the solution may contain a total amount of whey protein of at least 20% (w/w).

The whey protein solution may for example contain a total amount of whey protein in the range of 1-50% (w/w). For example, the solution may contain a total amount of whey protein in the range of 5-40% (w/w). The solution may e.g. contain a total amount of whey protein in the range of 10-30% (w/w). Alternatively, the solution may contain a total amount of whey protein in the range of 15-25% (w/w).

It is furthermore preferred that the whey protein solution contains a total amount of whey protein of at least 60% (w/w) on a dry weight basis, such as e.g. at least 70% (w/w) on a dry weight basis. For example, the solution may contain a total amount of whey protein of at least 75% (w/w) on a dry weight basis. The solution may e.g. contain a total amount of whey protein of at least 80% (w/w) on a dry weight basis. Alternatively, the solution may contain a total amount of whey protein of at least 85% (w/w) on a dry weight basis.

The whey protein solution may for example contain a total amount of whey protein in the range of 60-100% (w/w) on a dry weight basis. For example, the solution may contain a total amount of whey protein in the range of 65-95% (w/w) on a dry weight basis. The solution may e.g. contain a total amount of whey protein in the range of 70-90% (w/w) on a dry weight basis. Alternatively, the solution may contain a total amount of whey protein in the range of 75-85% (w/w) on a dry weight basis.

The whey protein used in the solution may be whey protein from acid whey, whey protein from sweet whey and/or milk protein from milk serum.

The whey protein solution preferably contains beta-lactoglobulin, which is an important component for the formation of insoluble whey protein particles. The solution may furthermore contain one or more of the additional proteins found in whey, for example alpha-lactalbumin and/or CMP.

Yet another aspect of the invention relates to a method of producing a high protein, juice-flavoured beverage, the method comprising:

a) forming a mixture comprising:
water,
sweetener
a total amount of protein of at least 4% (w/w)
a total amount of solids of a denatured whey protein composition of at least 2% (w/w) relative to the total weight of the beverage, the denatured whey protein composition containing:
a total amount of protein of at least 60% (w/w) on a dry weight basis relative to the total weight of the denatured whey protein composition, and
insoluble whey protein particles having a particle size in the range of 1-10 micron, where the amount of said insoluble whey protein particles is in the range of 50-100% (w/w) relative to the total amount of protein of the denatured whey protein composition,
a fruit flavouring agent, and
food acid
optionally, one or more additional ingredients.
b) optionally, if the pH of the mixture is higher than pH 4.8, reducing the pH of the mixture to a pH in the range of 3.0-4.8 by addition of a food acid, and
c) packaging the mixture,
wherein:
the mixture is heat-treated prior to, during or after packaging, or
the mixture is made of one or more heat-treated ingredients.

Step a) involves forming a mixture from several components including the solids of a denatured whey protein composition in an amount of at least 2% (w/w) relative to the total weight of the beverage. The solids of the denatured whey protein composition may be included in the mixture in the form of a powder, preferably having a water content of at most 6% (w/w) of the total weight of the powder; or as an aqueous suspension, for example having a water content of at least 50% (w/w) of the total weight of the denatured whey protein composition.

Typically, the solids of the denatured whey protein composition in the mixture are sufficient to provide the mixture with a total amount of protein of at least 4% (w/w) or more. In one embodiment the mixture has a total protein content of at least 5% (w/w); preferably at least 6% (w/w); more preferably at least 8% (w/w) relative to the total weight of the mixture. The denatured whey composition in the beverage is a major component of the protein content of the present beverage, whose composition is described in Example 2.

The mixture formed in step a) contains a total amount of protein of at least 4% (w/w). In one embodiment, the beverage has a total amount of protein of at least 5% (w/w); preferably at least 6% (w/w); more preferably at least 8% (w/w) relative to the total weight of the beverage. The denatured whey composition in the beverage is a major component of the protein content of the beverage.

The mixture formed in step a) comprises water. In one embodiment, the mixture has a composition that is suitable for ingestion as a beverage and has a water content of at least 75% relative to the total weight of the mixture, and the total dry weight of the mixture is typically at most 26% (w/w) relative to the total weight of the mixture. For example, the beverage may have a water content of at least 85% relative to the total weight of the beverage, and the total dry weight of the beverage is typically at most 15% (w/w) relative to the total weight of the beverage. In another embodiment, the mixture has a lower water content, suitable for providing a concentrate.

The mixture formed in step a) comprises a sweetener that may be a natural sweetener or an artificial sweetener. The natural sweetener may be a sugar in the form of one or more mono- and/or di-saccharide(s), or a non-sugar sweetener. The natural sweetener may be a native component of the denatured whey protein composition and/or the fruit-flavouring agent in the beverage. In addition to the native sweetener content of the whey protein composition and/or fruit-flavouring agent, the mixture may contain one or more sweetener(s) as described herein, in order to provide the desired sweetness of taste in the beverage to be ingested.

In one embodiment, the mixture formed in step a) contains a total amount of carbohydrate sweetener in the range of 4-15% (w/w) relative to the total weight of the beverage to be ingested. Alternatively, the beverage may comprise a total amount of carbohydrate sweetener in the range of 6-12% (w/w) relative to the total weight of the beverage to be ingested. Since the denatured whey protein composition and/or the fruit-flavouring agent in the beverage comprise natural sweetener, it will typically be sufficient to add carbohydrate sweetener in an amount of about 2-10% relative to the total weight of the beverage to be ingested to reach the desired sweetness of taste. Alternatively, the beverage may comprise a total amount of added carbohydrate sweetener in the range of 4-8% (w/w) relative to the total weight of the beverage to be ingested.

The mixture formed in step a) comprises a fruit flavouring agent that may be selected from one or more natural and/or artificial fruit flavouring agents, as described herein. Typically, the mixture comprises between 5 and 80% (w/w) of a fruit flavouring agent.

In one embodiment, the fruit flavouring agent comprises, or even consists of, a juice or a juice concentrate of one or more fruits. When the fruit flavouring agent is provided as a concentrate of the pure juice of one or more fruits, this concentrate comprises amounts in the range of 1-20% (w/w) of the beverage to be ingested. In one embodiment, the concentrate comprises amounts in the range of 2-15% (w/w) of the beverage, such as in the range of 2-10-% (w/w). When the fruit flavouring agent is provided as a non-concentrate of pure juice of one or more fruits, this juice may comprise amounts in the range of 5-60% (w/w) of the beverage to be ingested. In one embodiment, the pure juice comprises amounts in the range of 10-50% (w/w) of the beverage, or alternatively in the range of 15-40% (w/w) or 20-30%.

The mixture formed in step a) comprises one or more minerals that are typically a native component of the denatured whey protein composition. The mineral composition of the denatured whey protein composition and its measurement as ash is described herein. Typically, the total protein: ash content weight ratio of the denatured whey protein composition in the mixture is at least 15, preferably at least 20, and even more preferably at least 30, such at least 40 or at least 50.

A beverage containing the denatured whey protein composition typically has a total ash content in the range of 1-10% (w/w) relative to the dry weight of the beverage; preferably in the range of 3-8% (w/w), more preferably in the range of 4-6% (w/w) relative to the dry weight of the beverage.

The mixture formed in step a) comprises a food acid, as further described herein. Some or substantially all of the food acids in the mixture may be provided by the fruit flavouring agent. The total amount of food acid in the mixture may be at least 0.1% (w/w) relative to the total weight of the beverage to be ingested, preferably at least 0.5% (w/w), more preferably at least 0.75% (w/w); even more preferably at least 1.0% (w/w) relative to the total weight of the beverage to be ingested.

In a further embodiment, the beverage has a total acid content in the range of 0.5%-5% (w/w) relative to the total weight of the beverage to be ingested, more preferably in the range of 0.7-3.0 (w/w), even more preferably in the range of 0.8%-1.5% (w/w) relative to the total weight of the beverage to be ingested.

These total amounts of food acids in the beverage correspond to the sum of food acid, including both acidic, partly deprotonated and fully deprotonated forms of the food acid.

The one or more additional ingredients in the mixture of step a) may be selected among one or more vitamin(s), one or more stabilizer(s), one or more emulsifier(s) or a combination thereof. Vitamin(s), stabilizer(s) and emulsifier(s) that are suitable additional ingredients are described herein. The content of the one of more stabiliser(s) may be in the range of 0.01-3% (w/w) relative to the dry weight of the mixture, preferably in the range of 0.1 to 0.5% (w/w). The content of the one of more emulsifier(s) may be in the range of 0.01-3% (w/w) relative to the dry weight of the beverage, preferably in the range of 0.1 to 0.5% (w/w).

Step b) allows for the pH of the mixture to be adjusted to a pH in the range of 3.0-4.8 by addition of a food acid, if the pH is higher than 4.8. Typically, the food acid in the mixture of step a) will be sufficient to hold the pH of the mixture within the required range, but when this is insufficient it is preferred to adjust the pH with the same food acid as was added to the mixture.

The packaging of step c) may involve any suitable packaging techniques, and any suitable container may be used for packaging the high protein, acidified dairy product.

The packaging of step c) may for example involve aseptic packaging, i.e. the product is packaged under aseptic conditions. For example, the aseptic packaging may be performed by using an aseptic filling system, and it preferably involves filling the product into one or more aseptic container(s).

Examples of useful containers are e.g. bottles, cartons, bricks and/or bags.

The heat-treatment cited in step c) of the method serves the purpose of lowering the microbial load such that the product has a prolonged shelf-life when stored at ambient temperatures, e.g. in the range of 70-150 degrees C., and maintaining the temperature in that range for a duration sufficient to kill a substantial number of the viable microorganisms of the dairy base. Typically, at least 99% of the microorganisms are killed during the pasteurisation. Another purpose of the pasteurisation may be to denature at least some of the native whey protein which may be present in the denatured whey protein composition of step a).

The duration of heating depends on the temperature(s) of heating. For example, the dairy base may be heated to one or more temperatures in the range of 70-85 degrees C. for 1-30 minutes. The dairy base may e.g. be heated to one or more temperatures in the range of 80-95 degrees C. for 0.5-15 minutes. Alternatively, the dairy base may be heated to one or more temperatures in the range of 90-110 degrees C. for 0.2-10 minutes. For example, the dairy base may be heated to one or more temperatures in the range of 100-150 degrees C. for 1 second-2 minutes.

Step c) has two variants; in the case of variant I) the mixture obtained from step b) is subjected to heat-treatment prior to, during or after packaging. If heat-treatment is performed prior to packaging, this requires the use of both pre-sterilized packaging and sterile filling conditions, while heat-treatment during or after packaging reduces the need for stringent sterile conditions during filling and packaging.

In the case of variant II), the components of the mixture in steps a) and b) can be heat-treated individually or as a combination of one or more the components. Additionally, some ingredients may be sterilized by other means such as sterile filtration or ionising radiation. This has the advantage that sterilisation conditions can be optimised for the different types of components. For example, the whey protein composition and/or proteins can be sterilized separately from the fruit flavouring agent, the organic acid and the sweetener.

The one or more additional ingredients may be selected among one or more vitamin(s), one or more stabilizer(s), one or more emulsifier(s) or a combination thereof. Vitamin(s), stabilizer(s) and emulsifier(s) that are suitable additional ingredients are described herein.

Yet an aspect of the invention pertains to a heat-treated, high protein fruit and/or vegetable preparation suitable for the production of fruit- and/or vegetable-flavour yoghurt, the fruit and/or vegetable preparation comprising:
 a fruit and/or vegetable material in an amount of at least 10% (w/w)
 insoluble protein particles having a particle size in the range of 1-10 micron in an amount of at least 2% (w/w), the fruit and/or vegetable preparation having a total solids content in the range of 15-80% (w/w).

In the context of the present invention, the term "heat-treated fruit and/or vegetable preparation" relates to a fruit and/or vegetable preparation which has been heat-treated sufficiently to have a shelf-life of at least 10 days when stored at 5 degrees C., and preferably at least 20 days shelf-life when stored at 5 degrees C., such as e.g. at least 40 days shelf-life when stored at 5 degrees C.

Some fruit and/or vegetable preparation may be stable at ambient temperature, thus the fruit and/or vegetable preparation may e.g. have a shelf-life of at least 10 days when stored at 25 degrees C., and such as at least 20 days shelf-life when stored at 25 degrees C., such as e.g. at least 40 days shelf-life when stored at 25 degrees C. Longer shelf-lives of the fruit and/or vegetable preparation are also possible, such as e.g. at least 60 days shelf-life when stored at 25 degrees C., or even at least 80 days shelf-life when stored at 25 degrees C.

In some embodiments of the invention, the heat-treated fruit and/or vegetable preparation has a shelf-life at 25 degrees C. of at least 4 months such as at least 6 months.

In the context of the term "high protein fruit and/or vegetable preparation" pertains to a preparation which can be added to yoghurts to provide the yoghurt with the flavour of the fruit and/or vegetable. The high protein preparation contains at least 2% (w/w) protein and preferably even more protein.

The high protein fruit and/or vegetable preparation is preferably pumpable but may still have a slightly gelly and/or viscous character which allows it to keep whole fruit or fruit pieces suspended during storage.

The fruit and/or vegetable preparation preferably has a low level of syneresis.

As will be appreciated, the term "high protein fruit and/or vegetable preparation" covers:
 high protein fruit preparations, i.e. preparations that contain fruit material only and no vegetable material, or
 high protein vegetable preparations, i.e. preparations that contain vegetable material only and no fruit material, or
 high protein fruit and vegetable preparations, i.e. preparations that contain both fruit material and vegetable material.

In some preferred embodiments of the invention, the high protein fruit and/or vegetable preparation is a high protein fruit preparation in which case the fruit and/or vegetable material only contains fruit material.

In other preferred embodiments of the invention, the high protein fruit and/or vegetable preparation is a high protein vegetable preparation in which case the fruit and/or vegetable material only contains vegetable material.

In yet other preferred embodiments of the invention, the high protein fruit and vegetable preparation is a high protein fruit and vegetable preparation in which case the fruit and/or vegetable material contains both fruit material and vegetable material.

The term "fruit and/or vegetable material" therefore relates to the total sum of fruit material and vegetable material used in the fruit and/or vegetable preparation.

In the context of the present invention, the term "fruit and/or vegetable material" pertains to compositions that provide the flavour characteristics relating to the fruit and/or vegetable in question and which preferably are derived from fruit and/or vegetable.

The terms "fruit" and "vegetable" should be interpreted according to the culinary means of the terms.

The fruit and/or vegetable material may for example comprise, or even consist of, fruit and/or vegetable. The fruit and/or vegetable may be used in the form of whole fruit and/or vegetable or in the form of pieces of the fruit and/or vegetable.

The fruit and/or vegetable material may for example comprise, or even consist of, the flesh of fruit and/or vegetable.

The term "flesh" in the context of fruits and/or vegetables pertains to the composition that is left with the outer surface (e.g. the skin or peel) and/when the seeds and kernels have been removed. For example, the flesh of an apple is the material which is left when the peel and apple core of the apple have been removed.

The fruit and/or vegetable material may comprise, or even consist of, a fruit and/or vegetable juice, e.g. with or without fruit and/or vegetable pieces.

The term "fruit and/or vegetable pieces" pertain to particles or pieces of fruit and/or vegetable which are obtained by processing the whole fruit and/or vegetable or fruit and/or vegetable flesh into smaller bits. This processing may e.g. involve cooking, grinding, cutting, milling, blending, mashing and combinations thereof.

The fruit and/or vegetable material may comprise, or even consist of, a fruit and/or vegetable juice concentrate, e.g. with or without fruit and/or vegetable pieces. The present inventors have found that it is advantageous to use fruit juice concentrates and/or vegetable juice concentrates to obtain fruit preparations having very high protein contents.

A fruit and/or vegetable juice concentrate preferably has a brix level of at least 25, and preferably at least 40, and even more preferred at least 50, such as at least 60. The brix level is preferably measured at 25 degrees C.

The fruit and/or vegetable material may comprise, or even consist of, a fruit and/or vegetable puree. A fruit and/or vegetable puree is obtainable by blending and optionally also cooking the fruit and/or vegetable.

The fruit and/or vegetable material may comprise, or even consist of, a fruit and/or vegetable pulp. The term "fruit and/or vegetable pulp" pertains to the matter that is left after at least some of the fruit and/or vegetable juice has been removed from the processed fruit and/or vegetable.

The fruit and/or vegetable material may comprise, or even consist of, artificial fruit flavour. The artificial fruit flavour may be used alone or in combination with additional food acid and/or sweetener.

The fruit and/or vegetable preparation may for example comprise at least 20% (w/w) fruit and/or vegetable material, preferably at least 30% (w/w) fruit and/or vegetable material, and even more preferably at least 40% (w/w) fruit and/or vegetable material, such as at least 50% (w/w) fruit and/or vegetable material.

The fruit and/or vegetable preparation may e.g. comprise in the range of 10-90% (w/w) fruit and/or vegetable material, preferably in the range of 20-70% (w/w) fruit and/or vegetable material, and even more preferably in the range of 30-60% (w/w) fruit and/or vegetable material.

The fruit and/or vegetable material may comprise or even consist of whole fruit or a mixture of whole fruits.

The fruit and/or vegetable material may comprise or even consist of processed fruit.

In some embodiments of the invention, the fruit and/or vegetable material is a fruit-flavouring agent as defined herein.

In some embodiments of the invention, the fruit and/or vegetable preparation is a high-protein fruit-flavoured beverage described herein.

The fruit and/or vegetable material may contain two or more components selected from whole fruit, processed fruit, a fruit flavour agent or a combination thereof. The fruit and/or vegetable material may e.g. contain both whole fruit and fruit juice. Alternatively, the fruit and/or vegetable material may e.g. contain fruit pulp and fruit juice. Alternatively, the fruit and/or vegetable material may e.g. contain fruit pulp and fruit juice concentrate.

The fruit and/or vegetable material contains a single type of fruit, such as e.g. strawberry or cherry. Alternatively, the fruit and/or vegetable material may contain at least two different types of fruit.

Non-limiting examples of suitable fruits are orange, lemon, lime, pineapple, kiwi, papaya, apple, banana, pear, peach, strawberry, raspberry, cherry, cranberry, blackcurrant, grape fruit, boysenberry, blackberry, fig, redcurrant, gooseberry, pomegranate and/or melon.

Non-limiting examples of suitable vegetables are tomato, cucumber, red pepper, chilli pepper, onion, garlic, carrot, beed root, spinach and/or celeriac.

Some fruits and/or vegetables, such as kiwi, pineapple and papaya, contain protease enzymes that may hydrolyse the protein of the fruit and/or vegetable preparation thereby degrading the organoleptic properties of the fruit and/or vegetable preparation and food products including the fruit and/or vegetable preparation.

It is therefore preferred that fruit and/or vegetable preparation contains substantially no proteases that digest whey protein or denatured whey protein.

It may therefore be preferred to heat-treat the fruit and/or vegetable material or the fruit and/or vegetable preparation sufficiently to inactivate substantially all protease activity.

It is sometimes preferred that the fruit and/or vegetable material contains non-soluble fruit and/or vegetable solids such as primarily fruit or vegetable fibre, the non-dissolvable parts of the fruit flesh, optionally also seeds and skin. Thus, the term "non-soluble" in this context means non-soluble in water.

The amount of non-soluble fruit and/or vegetable solids is easily determined by:

i) dispersing the sample to be analysed thoroughly in water, ii) separating the non-soluble solids by centrifugation at 15000 g for 5 minutes, iii) removing the supernatant (which contains soluble solids), iv) re-dispersing the solids that were not present in the supernatant thoroughly in water v) repeating steps ii)-iv) 4 times vi) measuring the amount of solids that remain after a total of 5 times washing and centrifugation. The method Example 1.7 can be used for the measurement of step vi).

The fruit and/or vegetable material may for example contain a total amount of non-soluble fruit and/or vegetable solids of at most 30% (w/w dry weight), for example at most 20%, such as at most 10%, e.g. at most 5%.

However, for some uses a low content of non-soluble fruit and/or vegetable solids are preferred. This is for example the case if the fruit and/or vegetable preparation should contain a very high amount of protein. Thus, the fruit and/or vegetable material may have a total amount of non-soluble fruit and/or vegetable solids of at most 1% (w/w dry weight).

It may be desirable that the fruit and/or vegetable material contains whole fruit or fruit or vegetable pieces and hence insoluble fruit or vegetable solids. Thus, in some embodiments of the invention the fruit and/or vegetable material contains a total amount of non-soluble fruit and/or vegetable solids of at least 0.5% (w/w dry weight), preferably at least 1% (w/w dry weight), and even more preferred at least 5% (w/w dry weight). For example, the fruit and/or vegetable material may contain a total amount of non-soluble fruit and/or vegetable solids of at least 10% (w/w dry weight), e.g. at least 15% (w/w dry weight), such as at least 20% (w/w dry weight).

The fruit and/or vegetable preparation typically comprises a sweetener.

A range of different sweeteners may be used. However, the sweetener typically comprises a carbohydrate sweetener, a sugar alcohol and/or a high intensity sweetener (HIS).

Examples of useful carbohydrate sweetener, a sugar alcohol and high intensity sweetener (HIS) are described herein.

The total amount of carbohydrate sweetener and a sugar alcohol in the fruit and/or vegetable preparation may for example be in the range of 5-70% (w/w).

For example, the total amount of carbohydrate sweetener and a sugar alcohol in the fruit and/or vegetable preparation may be in the range 0.01-4% (w/w).

If used, the total amount of HIS in the fruit and/or vegetable preparation is typically in the range of 0.01-1% (w/w). For example, the total amount of HIS may be in the range of 0.01-0.5% (w/w). Alternatively, the total amount of HIS may be in the range of 0.03-0.3% (w/w).

If HIS is used, less carbohydrate sweetener and/or sugar alcohol is required. The present inventors have found that if at least part of the carbohydrate sweetener is replaced with HIS, more insoluble protein particles can be introduced into the fruit and/or vegetable preparation without destroying its pumpability and organoleptic properties. Alternatively, if the total protein is kept constant, the replacement of carbohydrate sweetener/sugar alcohol with HIS makes the fruit and/or vegetable preparation less viscous and e.g. more suitable for some drinking yoghurt applications.

Thus, in preferred embodiments of the invention the fruit and/or vegetable preparation comprises a total amount of carbohydrate sweetener and sugar alcohol of at most 20% (w/w) and at least 0.01% HIS. For example, the fruit and/or vegetable preparation may comprise a total amount of carbohydrate sweetener and sugar alcohol of at most 15% (w/w) and at least 0.02% HIS. Alternatively, the fruit and/or vegetable preparation may comprise a total amount of carbohydrate sweetener and sugar alcohol of at most 5% (w/w) and at least 0.05% HIS.

The fruit and/or vegetable preparation may furthermore comprise a thickening agent.

The thickening agent may for example comprise a carbohydrate-based thickening agent or a protein-based thickening agent.

Non-limiting examples of carbohydrate-based thickening agents include locust bean gum, guar gum, alginates, cellulose, xanthan gum, carboxymethyl cellulose, microcrystalline cellulose, carrageenans, pectins, starches and mixtures thereof.

Pectins are especially preferred, such as e.g. low methylester pectins, low methylester amidated pectins or high methylester pectins.

Non-limiting examples of protein-based thickening agents are gelatine and non-denatured whey protein.

In some embodiments of the invention, the fruit and/or vegetable preparation does not contain carbohydrate-based thickening agents beyond what is inherently present in the fruit and/or vegetable material.

For example, it may be preferred that the fruit and/or vegetable preparation does not contain artificial carbohydrate-based thickening agents.

Alternatively, it may be preferred that the fruit and/or vegetable preparation is substantially free of carbohydrate-based thickening agents, meaning that it contains at most 0.05% (w/w) carbohydrate-based thickening agents.

The total amount carbohydrate-based thickening agent are typically used in an amount of at most 5% (w/w), preferably at most 2% (w/w), even more preferably at most 1% (w/w), such as e.g at most 0.5% (w/w).

For example, the total amount of carbohydrate-based thickening agent may be in the range of 0.01-5% (w/w), e.g. in the range of 0.01-2% (w/w), such as in the range of 0.01-1% (w/w), such as e.g. in the range of 0.01-0.5% (w/w).

The total amount protein-based thickening agent may be at most 5% (w/w), preferably at most 2% (w/w), even more preferably at most 1% (w/w), such as e.g at most 0.5% (w/w).

The total amount of protein-based thickening agent is in the range of 0.01-5% (w/w), e.g. in the range of 0.02-2% (w/w), such as in the range of 0.05-1% (w/w), such as e.g. in the range of 0.1-0.5% (w/w).

The fruit and/or vegetable preparation may furthermore comprise one or more food-acceptable colouring agents.

The fruit and/or vegetable preparation may furthermore comprise a fat, but typically in relatively small amounts. Typically, the fruit and/or vegetable preparation contains at most 5% (w/w) fat. Preferably, the fruit and/or vegetable preparation contains at most 2% (w/w) fat. Even more preferably the fruit and/or vegetable preparation contains at most 1% (w/w). It may even be preferred that the fruit and/or vegetable preparation contains substantially no fat, e.g. at most 0.1% (w/w) fat.

The fruit and/or vegetable preparation normally has a pH in the range of 3.0-5.0, preferably in the range of 3.2-4.8, and even more preferably in the range of 3.4-4.6.

The present inventors have found that adjusting the pH of the high protein fruit and/or vegetable preparation into the right range is advantageous and provides improved organoleptic properties. The added protein typically has a pH which is close to neutral and a high buffer capacity. The pH of the fruit and/or vegetable preparation may therefore be outside the preferred range unless it is adjusted.

The pH is preferably adjusted by addition of food acids.

Thus, the fruit and/or vegetable preparation may e.g. comprise one or more food acids selected from the group consisting of citric acid, malic acid, tartaric acid, acetic acid, benzoic acid, butyric acid, lactic acid, fumaric acid, succinic acid, ascorbic acid, adipic acid, phosphoric acid and mixtures thereof. In a further embodiment, some or substantially all of the food acid in the fruit and/or vegetable preparation is provided by the fruit and/or vegetable material The total amount of food acid in the fruit and/or vegetable preparation is normally at least 0.1% (w/w) relative to the total weight of the preparation, preferably at least 0.5% (w/w), more preferably at least 0.75% (w/w); even more preferably at least 1.0% (w/w) relative to the total weight of the preparation.

The fruit and/or vegetable preparation may e.g. have a total food acid content in the range of 0.1%-5% (w/w) relative to the total weight of the preparation, more preferably in the range of 0.3-3.0 (w/w), even more preferably in the range of 0.5%-1.5% (w/w) relative to the total weight of the beverage.

These total amounts of food acids in the fruit and/or vegetable preparation correspond to the sum of food acid, including both acidic, partly deprotonated and fully deprotonated forms of the food acid.

The fruit and/or vegetable preparation may be tailored to different applications which require different viscosities of the preparation. The fruit and/or vegetable preparation typically has a viscosity in the range of 5-4000 cP.

The viscosity of a fruit and/or vegetable preparation is preferably measured as described in Nautiyal, International Journal of Food Science and Nutrition Engineering 2012, 2(2): pages 6-11.

The fruit and/or vegetable preparation may for example have a viscosity of 5-2000 cP, e.g. 10-1000 cP, such as for example 20-500 cP, or e.g. 10-300 cP. These relatively low viscosities may e.g. be useful for preparing low viscosity acidified dairy products such as drinking yoghurts.

The fruit and/or vegetable preparation may have a viscosity in the range of 500-4000 cP, e.g. 800-3500 cP, such as for example 1000-3000 cP or e.g. 1500-3500 cP. These relatively high viscosities may e.g. be useful for preparing acidified dairy products of higher viscosity such as e.g. stirred yoghurts. These fruit and/or vegetable preparations may also be useful for drinking yoghurts.

The fruit and/or vegetable preparation may also have a viscosity in the range of 10-3500 cP, e.g. 20-3000 cP, such as for example 40-2000 cP or e.g. 50-1500 cP.

A significant portion of the protein of the fruit and/or vegetable preparation comes from insoluble protein particles having a particle size in the range of 1-10 micron, and preferably insoluble whey protein particles.

In some embodiments of the invention, the fruit and/or vegetable preparation comprises insoluble protein particles having a particle size in the range of 1-10 micron in an amount of at least 4% (w/w), preferably at least 6% (w/w), and even more preferably at least 8% (w/w).

The fruit and/or vegetable preparation may e.g. comprise insoluble whey protein particles having a particle size in the range of 1-10 micron in an amount in the range of 2-30% (w/w), preferably in the range of 4-25% (w/w), and even more preferably in the range of 6-20% (w/w), such as e.g. in the range of 8-18% (w/w).

Insoluble protein particles may contain a range of different denatured protein types. However, in some embodiments of the invention, insoluble protein particles having a particle size in the range of 1-10 micron comprise or even consist of insoluble protein particles selected from the group consisting of denatured whey protein, denatured egg white protein, denatured pea protein and denatured soy protein.

For example, the insoluble protein particles having a particle size in the range of 1-10 micron may comprise, or even consist, of denatured egg white protein.

Alternatively, the insoluble protein particles having a particle size in the range of 1-10 micron may comprise, or even consist, of denatured soy protein.

The insoluble protein particles having a particle size in the range of 1-10 micron may e.g. comprise, or even consist, of denatured pea protein.

However, it is presently preferred that the insoluble protein particles having a particle size in the range of 1-10 micron, comprise or even consist, of denatured whey protein.

The fruit and/or vegetable preparation may furthermore comprise undenatured protein, e.g. undenatured whey protein.

For example, the weight ratio between undenatured protein and insoluble protein particles may be at most 1:1, preferably at most 1:2, and even more preferably at most 1:4, such as at most 1:10.

Undenatured whey protein forms weak gel when heated at acidic pH and may therefore be used as a thickening agent.

For example, the weight ratio between undenatured protein and insoluble protein particles may be at most 1:1, preferably at most 1:2, and even more preferably at most 1:4, such as at most 1:10.

The weight ratio between undenatured protein and insoluble protein particles may e.g. be in the range of 1:1-1:20. For example, the weight ratio between undenatured protein and insoluble protein particles may be in the range of 1:2-1:15. Alternatively, the weight ratio between undenatured protein and insoluble protein particles may be in the range of 1:4-1:15, such as in the range 1:4-1:10.

In some preferred embodiments of the invention, the insoluble protein particles are provided by a denatured whey protein composition as defined herein, e.g. a denatured whey protein composition containing:
- a total amount of protein of at least 60% (w/w) on a dry weight basis relative to the total weight of the denatured whey protein composition,
- insoluble whey protein particles having a particle size in the range of 1-10 micron, where the amount of said insoluble whey protein particles is in the range of 50-100% (w/w) relative to the total amount of protein of the denatured whey protein composition.

The denatured whey protein composition may for example contain:
- a total amount of protein of at least 60% (w/w) on a dry weight basis relative to the total weight of the denatured whey protein composition,
- insoluble whey protein particles having a particle size in the range of 1-10 micron, where the amount of said insoluble whey protein particles is in the range of 50-90% (w/w) relative to the total amount of protein of the denatured whey protein composition, and
- a total amount of soluble alpha-lactalbumin and beta-lactoglobulin in the range of 5-40% (w/w) relative to the total amount of protein of the denatured whey protein composition.

The fruit and/or vegetable preparation typically has a total amount of protein of at least 2% (w/w), and preferably at least 6% (w/w), and even more preferably at least 8% (w/w).

The fruit and/or vegetable preparation may e.g. have a total amount of protein in the range of 2-30% (w/w), preferably in the range of 4-25% (w/w), and even more preferably in the range of 6-20% (w/w), such as e.g. in the range of 8-18% (w/w).

The fruit and/or vegetable preparation typically has a total solids content in the range of 15-85% (w/w). The fruit and/or vegetable preparation may e.g. have a total solids content in the range of 15-60% (w/w), for example 20-55% (w/w), such as e.g. 25-50% (w/w).

Alternatively, the fruit and/or vegetable preparation may have a total solids content in the range of 40-80% (w/w), for example 45-75% (w/w), such as e.g. 50-70% (w/w).

Also, the fruit and/or vegetable preparation may have a total solids content in the range of 20-70% (w/w), for example 30-60% (w/w), such as e.g. 35-55% (w/w).

The fruit and/or vegetable preparation may have a total amount of non-soluble fruit and/or vegetable solids of at most 10% (w/w relative to the total weight of the fruit and/or vegetable preparation), for example at most 5% (w/w relative to the total weight of the fruit and/or vegetable preparation), e.g. at most 1% (w/w relative to the total weight of the fruit and/or vegetable preparation).

The fruit and/or vegetable preparation may have a total amount of non-soluble fruit and/or vegetable solids of most 0.1% (w/w relative to the total weight of the fruit and/or vegetable preparation).

However, if the fruit and/or vegetable preparation comprises a significant amount of whole fruit or pieces of fruit and/or vegetable, it normally also contains a significant amount of non-soluble fruit and/or vegetable solids. Thus, the fruit and/or vegetable preparation may comprise a total amount of non-soluble fruit and/or vegetable solids in the range of 0.1-10% (w/w relative to the total weight of the fruit and/or vegetable preparation), for example in the range of 0.2-8% (w/w relative to the total weight of the fruit and/or vegetable preparation), or e.g. in the range of 0.5-5% (w/w relative to the total weight of the fruit and/or vegetable preparation).

In some preferred embodiments of the invention, the heat-treated, high protein fruit and/or vegetable preparation comprises:
- a fruit and/or vegetable material in an amount of at least 10% (w/w)
- insoluble whey protein particles having a particle size in the range of 1-10 micron in an amount in the range of 6-20% (w/w),
- a sweetener
- the fruit and/or vegetable preparation having a total solids content in the range of 15-80% (w/w), a pH in the range of 3.0-4.8.

In some preferred embodiments of the invention, the heat-treated, high protein fruit and/or vegetable preparation comprises:

a fruit and/or vegetable material in an amount of at least 10% (w/w)
insoluble whey protein particles having a particle size in the range of 1-10 micron in an amount in the range of 8-18% (w/w),
a sweetener
the fruit and/or vegetable preparation having a total solids content in the range of 15-80% (w/w), a pH in the range of 3.0-4.8.

In some preferred embodiments of the invention, the heat-treated, high protein fruit and/or vegetable preparation comprises:
a fruit and/or vegetable material in an amount of at least 10% (w/w)
insoluble whey protein particles having a particle size in the range of 1-10 micron in an amount in the range of 6-20% (w/w),
total amount of carbohydrate sweetener and sugar alcohol of at most 20% (w/w) and at least 0.01% HIS,
the fruit and/or vegetable preparation having a total solids content in the range of 15-80% (w/w), and a pH in the range of 3.0-4.8.

In some preferred embodiments of the invention, the heat-treated, high protein fruit and/or vegetable preparation comprises:
a fruit and/or vegetable material in an amount of at least 10% (w/w), said fruit and/or vegetable material comprising whole fruit and/or pieces of fruit flesh,
insoluble whey protein particles having a particle size in the range of 1-10 micron in an amount in the range of 6-20% (w/w),
the fruit and/or vegetable preparation having a total solids content in the range of 15-80% (w/w), and a pH in the range of 3.0-4.8.

In some preferred embodiments of the invention, the heat-treated, high protein fruit and/or vegetable preparation comprises:
a fruit and/or vegetable material in an amount of at least 10% (w/w), wherein a said fruit and/or vegetable preparation is a fruit and/or vegetable juice concentrate comprising at most 5% (w/w dry weight) non-soluble fruit and/or vegetable solids,
insoluble whey protein particles having a particle size in the range of 1-10 micron in an amount in the range of 6-20% (w/w),
the fruit and/or vegetable preparation having a total solids content in the range of 15-80% (w/w), and a pH in the range of 3.0-4.8.

Yet an aspect of the invention pertains to a method of producing a high protein fruit and/or vegetable preparation, the method comprising the steps of:
1) providing:
a fruit and/or vegetable material,
insoluble protein particles, preferably insoluble whey protein particles, having a particle size in the range of 1-10 micron,
optionally extra water, and
optionally, one or more additional ingredients,
2) combining the fruit and/or vegetable material, the insoluble protein particles having a particle size in the range of 1-10 micron, and optionally also the one or more additional ingredients to obtain a mixture wherein the fruit and/or vegetable material is present in an amount of at least 10% (w/w) and wherein the insoluble whey protein particles having a particle size in the range of 1-10 micron is present in an amount of at least 2% (w/w), and
3) heat-treating the mixture of step 2) thereby obtaining the heat-treated high protein fruit and/or vegetable preparation.

The method may furthermore comprise a step 4) of packaging the heat-treated fruit and/or vegetable preparation.

The source of the insoluble protein particles having a particle size in the range of 1-10 micron may e.g. be a dry powder or a suspension. The source of the insoluble protein particles may for example be a denatured whey protein composition as defined herein.

When the source of the insoluble protein particles is provided in the form of powder, it is preferred to suspend it in water before it is mixed with the fruit and/or vegetable material.

While the suspension of the insoluble protein particles in principle can be mixed immediately with fruit and/or vegetable material, it is preferred to allow the insoluble protein particles to hydrate in the suspension for at least 20 minutes before it is mixed with the fruit and/or vegetable material. The insoluble protein particles may for example be allowed to hydrate for at least 30 minutes, such as for at least 1 hour or at least 2 hours.

While not always being necessary, it is sometimes preferred that the suspension containing the insoluble protein particles is subjected to homogenisation before it is mixed with the fruit and/or vegetable material.

The present inventors have found that sometimes it is advantageous to make the suspension containing the insoluble protein particles relatively concentrated to reduce the dilution of fruit and/or vegetable material.

Thus, the suspension may e.g. comprise at least 10% (w/w) insoluble protein particles having a particle size in the range of 1-10 micron, preferably at least 15% (w/w), even more preferably at least 20% (w/w) such as at least 25% (w/w).

For example, the suspension may comprise an amount of insoluble protein particles having a particle size in the range of 1-10 micron, in the range of 10-40% (w/w) preferably in the range of 15-35% (w/w), even more preferably in the range of 20-35% (w/w), such as in the range of 25-35% (w/w).

If a thickening agent such as e.g. a pectin is to be used, it is preferred that it is dissolved in water or an aqueous solution having a temperature of at least 50 degrees C.

The thickener may for example be mixed into the suspension containing the insoluble protein particles.

In some preferred embodiments of the invention, step 2) involves:
Mixing the source of the insoluble protein particles with the extra water and allowing the suspension to hydrate for at least 20 minutes at most 10 degrees C.
The protein mixture is heated to at a temperature in the range of 50-70 degrees C., and if carbohydrate-based thickening agent is used, it is mixed into and dissolved in the heated protein suspension,
Heating the fruit and/or vegetable material, optionally adding one or more additional ingredients such as sweetener, to a temperature of at least 85 degrees C. for at least 5 minutes,
Mixing the heat-treated fruit and/or vegetable material with the heat-treated protein suspension, and
Adjusting the pH of the combined mixture to a pH in the range of 3.0-4.8.

In other preferred embodiments of the invention, step 2) involves:

Mixing the source of the insoluble protein particles with the extra water and allowing the suspension to hydrate for at least 20 minutes at most 10 degrees C.

Providing a conventional fruit and/or vegetable preparation having a total protein content of at most 1% (w/w), Mixing the conventional fruit and/or vegetable preparation with the protein suspension, and Adjusting the pH of the combined mixture to a pH in the range of 3.0-4.8.

In some preferred embodiments of the invention, step 2) involves:

Mixing the source of the insoluble protein particles with the fruit and/or vegetable material, and optionally adding one or more additional ingredients such as sweetener, and allowing the resulting suspension to hydrate for at least 20 minutes at at most 10 degrees C., Adjusting the pH of the combined mixture to a pH in the range of 3.0-4.8.

The pH adjustments may e.g. be performed using concentrated solutions of food acids, such as citric acid.

Step 3) of the method of producing the fruit and/or vegetable preparation involves heat-treating the preparation at at least 80 degrees C. for at least 1 minute, such as at at least 80 degrees C. for at least 5 minutes, or such as at at least 85 degrees for at least 5 minutes. As will be appreciated by the skilled person, even higher temperatures and longer exposure times may be used.

Optionally, the heat-treated fruit and/or vegetable preparation can be subjected to smoothening, e.g. by stirring, pumping or homogenisation prior to the packaging.

In step 4) of the method the preparation is packaged, e.g. under sterile conditions and using an inert atmosphere to pressurized the packaged fruit and/or vegetable preparation in the sealed container.

The present inventors have found that it is challenging to prepare fruit and/or vegetable flavoured high protein dairy products, and particularly liquid dairy products because the addition of conventional fruit preparation, which normal has a low protein content, dilutes the protein content of the other ingredients. Fruit-flavoured yoghurt is conventionally prepared by producing a non-flavoured acidified white base, which is then mixed with the fruit preparation. If a high protein white base is to be used (containing e.g. 10% (w/w) total protein) and is to be mixed with a conventional fruit preparation (containing e.g. 0.5% (w/w) total protein) in the proportion 2 parts white base to 1 part fruit preparation, the resulting fruit-flavoured yoghurt would only have a total protein content of approx. 6.8% (w/w).

The present inventors have invented a new type of fruit preparation (or fruit and/or vegetable preparation) which contains a significant amount of protein in addition to the fruit material that is normally present in the preparation. Examples of the preparation of high protein fruit preparations are described in Examples 4-5.

Examples 6-7 demonstrate that it is possible to prepare a high protein, fruit-flavoured dairy product without diluting the protein content of the white yoghurt base—which would not be the case if conventional pectin-based fruit preparation was used. The examples furthermore demonstrate that the high protein fruit preparation can be used to give the final yoghurt product a higher protein content than that of the white base.

This opens up for a new approach to producing high protein, fruit flavoured dairy products, which involves providing a conventional dairy base (e.g. a conventional yoghurt white base) and adding a high protein, fruit preparation to the conventional dairy white base to produce a dairy product with a higher level of protein compared to the conventional dairy product.

An aspect of the invention therefore pertains to the use of the heat-treated, high protein fruit preparation for increasing the total protein content of a food product, such as e.g. a fruit-flavoured acidified dairy product (e.g. yoghurt). It should be noted that the inventive fruit preparation may be used to provide at least 30% (w/w) of the total protein of the final food product, and e.g. at least 50% (w/w) of the total protein of the final product, such as at least 75% (w/w) of the total protein of the final product. This is for example advantageous where the other ingredients of the food product have a lower protein content than the fruit and/or vegetable preparation.

Another aspect of the invention pertains to a food product comprising the heat-treated, high protein fruit and/or vegetable preparation as defined herein.

The fruit and/or vegetable preparation may be present in a separate part of the food product, which separate part only contains the fruit and/or vegetable preparation, or it may be blended with other components of the of the food product.

For example, the food product may contain a portion where the fruit and/or vegetable preparation is blended with other components of the food product and a separate part of the food product which separate part only contains the fruit and/or vegetable preparation.

The food product may for example comprise the fruit and/or vegetable preparation in an amount of at least 2% (w/w), preferably at least 10% (w/w), and even more preferably at least 20% (w/w), such as at least 40% (w/w).

The food product may for example comprise the fruit and/or vegetable preparation in an amount in the range of 2-80% (w/w), preferably in the range of 10-60% (w/w), and even more preferably in the range of 20-50% (w/w).

The food product may be any kind of food product which can benefit from protein contribution and/or the sensory contribution of the heat-treated, high protein fruit and/or vegetable preparation.

Non-limiting examples of such food products are bakery products such as bread, cakes, pies and pizzas; dessert products such as ice creams, puddings, fruit gels and sorbets; snack bars like mush bars and candy bars; dressings and dip-type products; sauces; and spreads.

In a preferred embodiment of the invention, the food product is an acidified dairy product, and preferably a high protein, acidified dairy product.

The acidified food product may e.g. be is selected from the group consisting of yoghurt, skyr, sour cream, sour buttermilk, cottage cheese, quark, fromage frais, and an acidified whey beverage.

Yet an aspect of the invention pertains to a high protein acidified dairy product comprising at least 4% (w/w) protein, said high protein acidified dairy product comprising the heat-treated, high protein fruit and/or vegetable preparation described herein.

The fruit and/or vegetable preparation may be present in a separate part of the high protein acidified dairy product which separate part only contains the fruit and/or vegetable preparation. For example, the fruit and/or vegetable preparation may be present in a separate layer which only contains the fruit and/or vegetable preparation.

In some embodiments of the invention the fruit and/or vegetable preparation is blended or mixed with other components of the of the high protein acidified dairy product.

In other embodiments of the invention the high protein acidified dairy product comprises a portion where the fruit and/or vegetable preparation is blended with other components of the of the high protein acidified dairy product and a portion where the fruit and/or vegetable preparation is present in a separate part of the high protein acidified dairy product which separate part contains only the fruit and/or vegetable preparation.

The high protein acidified dairy product typically comprises the fruit and/or vegetable preparation in an amount of at least 2% (w/w). Preferably, high protein acidified dairy product comprises the fruit and/or vegetable preparation in an amount at least 10% (w/w). Even more preferably, the high protein acidified dairy product comprises the fruit and/or vegetable preparation in an amount at least 20% (w/w).

The high protein acidified dairy product may for example comprise fruit and/or vegetable preparation in an amount in the range of 2-80% (w/w), preferably in the range of 10-60% (w/w), and even more preferably in the range of 20-50% (w/w).

In some preferred embodiments the high protein dairy product is a high protein, acidified dairy product containing:
  a total amount of protein of at least 7% (w/w), and
  fruit and/or vegetable preparation in an amount of at least 2% (w/w).

In the context of the present invention the term "acidified dairy product" relates to a dairy product having a pH of at most 5.5, such as at most 5.0 or even at most 4.7. An acidified dairy product may even have a pH of at most 4.4. The pH range of an acidified dairy product is typically pH 3.5-5.5. Preferably the acidified dairy product has a pH in the range of pH 4.0-5.0. Even more preferably, the acidified dairy product has a pH in the range of pH 4.2-4.8, such as e.g. approx. pH 4.6.

In some preferred embodiments of the invention, the high protein, acidified dairy product has a total amount of protein of at least 8% (w/w). For example, the high protein, acidified dairy product may have a total amount of protein of at least 10% (w/w). The high protein, acidified dairy product may e.g. have a total amount of protein of at least 12% (w/w). Alternatively, the high protein, acidified dairy product may e.g. have a total amount of protein of at least 14% (w/w).

An even higher protein content may be desired, thus, the high protein, acidified dairy product may have a total amount of protein of at least 16% (w/w). The high protein, acidified dairy product may e.g. have a total amount of protein of at least 18% (w/w). Alternatively, the high protein, acidified dairy product may e.g. have a total amount of protein of at least 21% (w/w).

Typically, the high protein, acidified dairy product has a total amount of protein in the range of 7-25% (w/w). For example, the high protein, acidified dairy product may have a total amount of protein in the range of 8-20% (w/w). The high protein, acidified dairy product may e.g. have a total amount of protein of at least 10-18% (w/w). Alternatively, the high protein, acidified dairy product may e.g. have a total amount of protein of at least 12-16% (w/w).

In some embodiments of the invention, the high protein, acidified dairy product has a total amount of protein in the range of 21-25% (w/w).

In some preferred embodiments of the invention, the high protein, acidified dairy product is a yoghurt.

In the context of the present invention, the term "yoghurt" refers to an acidic or fermented food or beverage product prepared from a one or more dairy components, and which has been acidified by means of microorganisms and/or chemical acidulants. It should be noted that the term "yoghurt" also refers to yoghurt-like products that may include non-dairy derived lipids, flavourings and food-approved stabilisers, acids and texturizers. Heat-treated yoghurt and yoghurt-like products are also included by the term yoghurt. The term "yoghurt" includes set yoghurts, stirred yoghurts, drinking yoghurt and Petit Suisse.

The yoghurts according to the present invention may, but need not, contain casein.

For example, the high protein yoghurt may have a weight ratio between casein and whey protein of at most 50:50. For example, the weight ratio between casein and whey protein of the high protein yoghurt may be at most 30:70. The weight ratio between casein and whey protein of the high protein yoghurt may e.g. be at most 20:80. Alternatively, the weight ratio between casein and whey protein of the high protein yoghurt may e.g. be at most 15:85, such as e.g. at most 10:90.

In some preferred embodiments of the invention high protein yoghurt is a set yoghurt. Set yoghurts (or set-type yoghurts) are typically characterised in a gelly-like texture and are often allowed to incubate and cool in the final package. Set yoghurts are normally non-pourable and are often eaten out of the packaging with a spoon.

In other preferred embodiments of the invention, the high protein yoghurt is a stirred yoghurt. Relative to a set yoghurt, a stirred yoghurt is pourable but often still rather viscous. The term "stirred" is most likely based on the fact that the acidified yoghurt milks originally were stirred to break the formed coagulum/gel and make the product more liquid and pumpable. However, in the context of the present invention, the term "stirred yoghurt" also encompasses yoghurts which have not been subjected to stirring, but which have obtained a liquid-like, viscous texture by other ways.

A stirred yoghurt may for example have a viscosity of at most 2500 cP, and typically in the range of 350-2500 cP. For example, the viscosity of the stirred yoghurt may be in the range of 400-2000 cP. The viscosity of the stirred yoghurt may e.g. be in the range of 500-1500 cP. Alternatively, the viscosity of the stirred yoghurt may be in the range of 600-1250 cP.

In further preferred embodiments of the invention, the high protein yoghurt is a drinking yoghurt, which may be perceived as low viscosity, drinkable yoghurt. A drinking yoghurt may for example have a viscosity of at most 400 cP, and typically in the range of 4-400 cP. For example, the viscosity of the drinking yoghurt may be in the range of 10-300 cP. The viscosity of the drinking yoghurt may e.g. be in the range of 15-200 cP. Alternatively, the viscosity of the drinking yoghurt may be in the range of 20-150 cP.

In some preferred embodiments of the invention, the high protein, acidified dairy product, e.g. a high protein yoghurt, comprises one or more sweeteners, such as carbohydrate sweeteners, polyols and/or high intensity sweeteners.

The high protein, acidified dairy product, e.g. a high protein yoghurt, may e.g. comprise a total amount of carbohydrate sweetener in the range of 1-20% (w/w) relative to the total weight of the acidified dairy product. Alternatively, the acidified dairy product, e.g. a high protein yoghurt, may comprise a total amount of carbohydrate sweetener in the range of 4-15% (w/w) relative to the total weight of the acidified dairy product. Since other ingredients of the acidified dairy product inherently may comprise some carbohydrate sweetener, such as lactose, it will often be sufficient to add carbohydrate sweetener in an amount of about 2-10% relative to the total weight of the acidified dairy product to reach the desired sweetness of taste. Alternatively, the acidified dairy product may comprise a total amount of added carbohydrate sweetener in the range of 4-8% (w/w) relative to the total weight of the acidified dairy product.

A high protein, acidified dairy product, e.g. a high protein yoghurt, containing the denatured whey protein composition may further comprise one of more non-carbohydrate natural or artificial sweeteners as described herein.

If used, the total amount of HIS is typically in the range of 0.01-2% (w/w). For example, the total amount of HIS may be in the range of 0.05-1.5% (w/w). Alternatively, the total amount of HIS may be in the range of 0.1-1.0% (w/w).

It may furthermore be preferred that sweetener, comprises or even consists of, one or more polyol sweetener(s). Non-limiting examples of useful polyol sweetener are maltitol, mannitol, lactitol, sorbitol, inositol, xylitol, threitol, galactitol, or combinations thereof.

If used, the total amount of polyol sweetener is typically in the range of 1-20% (w/w). For example, the total amount of polyol sweetener may be in the range of 2-15% (w/w). Alternatively, the total amount of polyol sweetener may be in the range of 4-10% (w/w).

In one embodiment the high protein, acidified dairy product, e.g. a high protein yoghurt, contains the casein, e.g. in the form of caseinate or micellar casein. The use of micellar casein is sometimes preferred as it contributes less to the viscosity of the final product than caseinate.

Examples of suitable sources of micellar casein are whole milk, non-fat milk, skimmed-milk, semi-skimmed milk, and butter milk. These sources may be used both as liquid milk or in dried, powdered form.

The caseinate may e.g. be Na-caseinate or Ca-caseinate or other caseinate salts.

High protein yoghurt may e.g. contain casein in an amount in the range of 0-90% (w/w) relative to the total amount of protein, such as e.g. in the range of 0-70% (w/w) relative to the total amount of protein. When using a high casein level the yoghurts tend to become highly viscous and may even form a non-pourable gel. Stirred high protein yoghurts often contain casein in an amount in the range of 25-60% (w/w) relative to the total amount of protein, such as e.g. in the range of 30-55% (w/w) relative to the total amount of protein, or even in the range of 35-50% (w/w) relative to the total amount of protein.

High protein drinking yoghurt may e.g. contain casein in an amount in the range of 0-35% (w/w) relative to the total amount of protein, such as e.g. in the range of 0-30% (w/w) relative to the total amount of protein. High protein drinking yoghurts may e.g. contain casein in an amount in the range of 5-30% (w/w) relative to the total amount of protein. For example, high protein drinking yoghurts may contain casein in an amount in the range of 10-30% (w/w) relative to the total amount of protein. Alternatively, high protein drinking yoghurts may contain casein in an amount in the range of 15-30% (w/w) relative to the total amount of protein, or even in the range of 20-30% (w/w) relative to the total amount of protein.

In some embodiments of the invention, the acidified dairy product, e.g. a high protein yoghurt, furthermore contains native whey protein e.g. in the form for whey protein concentrates or whey protein isolates. Native whey protein is also provided by several milk protein sources, such as liquid or dried milk and by milk protein concentrates.

High protein yoghurt may e.g. contain native whey protein in an amount in the range of 0-40% (w/w) relative to the total amount of protein, such as e.g. in the range of 2-30% (w/w) relative to the total amount of protein. High protein yoghurts may e.g. contain native whey protein in an amount in the range of 3-30% (w/w) relative to the total amount of protein. For example, high protein yoghurts may contain native whey protein in an amount in the range of 4-25% (w/w) relative to the total amount of protein. Alternatively, high protein yoghurts may contain native whey protein in an amount in the range of 5-20% (w/w) relative to the total amount of protein, or even in the range of 6-15% (w/w) relative to the total amount of protein.

It should be noted that while both casein and native whey protein may be present in the ingredients of the acidified dairy product, such a high protein yoghurt, they often aggregates and form part of gel networks and/or particles during the processing of the acidified dairy product—especially if prolonged pasteurisation is involved. The amounts of protein components of the acidified dairy product which are mentioned herein therefore primarily relate to the ingredients which are used for producing the product.

The acidified dairy product, e.g. a high protein yoghurt, may furthermore comprise one of more vitamin(s) and similar other ingredients such as vitamin A, vitamin D, vitamin E, vitamin K, thiamine, riboflavin, pyridoxine, vitamin B12, niacin, folic acid, pantothenic acid, biotin, vitamin C, choline, inositol, their salts, their derivatives, and combinations thereof.

The acidified dairy product, e.g. a high protein yoghurt, may furthermore comprise one of more stabilizer(s). Suitable stabilizers which can be used in the present invention include locust bean gum, guar gum, alginates, cellulose, xanthan gum, carboxymethyl cellulose, microcrystalline cellulose, carrageenans, pectins, inulin, and mixtures thereof.

The content of the one of more stabiliser(s) may e.g. be in the range of 0.01-5% (w/w) relative to the dry weight of the product, preferably in the range of 0.1 to 0.5% (w/w).

The acidified dairy product, e.g. a high protein yoghurt, may furthermore comprise one of more emulsifier(s). Suitable emulsifiers to be used are mono- and di-glycerides, citric acid esters of mono- and di-glycerides, diacetyltartaric acid esters of mono- and di-glycerides polysorbate, lecithin, or polyol esters of fatty acids such as propylene glycol monoester of fatty acids, as well as natural emulsifiers such as egg yolk, butter milk, raw acacia gum, rice bran extract, or mixtures thereof.

The content of the one of more emulsifier(s) may be in the range of 0.01-3% (w/w) relative to the dry weight of the product, for example in the range of 0.1 to 0.5% (w/w).

In some preferred embodiments, the yoghurt is a stirred yoghurt comprising a white base and the high protein fruit and/or vegetable preparation, wherein:

the white base is present in an amount of 10-90% (w/w) of the total product and comprises:
  a total amount of protein in the range of 9-18% (w/w) relative to the weight of the white base,
  insoluble protein particles having a particle size in the range of 1-10 micron in an amount of at least 2% (w/w),
  casein in an amount in the range of 30-65% (w/w) relative to the total amount of protein of the white base,
  a total amount of fat of at most 10% (w/w), preferably at most 3% (w/w) relative to the weight of the white base,
  a total amount of carbohydrate in the range of 2-20% (w/w) relative to the weight of the white base, and the fruit and/or vegetable preparation is present in an amount of 10-90% (w/w) of the total product and comprises:
  a total amount of protein in the range of 6-20% (w/w) relative to the
  weight of the fruit and/or vegetable preparation, and
  the fruit and/or vegetable preparation having a viscosity in the range of 500-4000 cP.

In some preferred embodiments, the yoghurt is a stirred yoghurt comprising a white base and the high protein fruit and/or vegetable preparation, wherein:

the white base is present in an amount of 50-85% (w/w) of the total product and comprises:
a total amount of protein in the range of 9-18% (w/w) relative to the weight of the white base,
insoluble protein particles having a particle size in the range of 1-10 micron in an amount of at least 2% (w/w),
casein in an amount in the range of 30-65% (w/w) relative to the total amount of protein of the white base,
a total amount of fat of at most 10% (w/w), preferably at most 3% (w/w) relative to the weight of the white base,
a total amount of carbohydrate in the range of 2-20% (w/w) relative to the weight of the white base, and
the fruit and/or vegetable preparation is present in an amount of 15-50% (w/w) of the total product and comprises:
a total amount of protein in the range of 6-20% (w/w) relative to the
weight of the fruit and/or vegetable preparation, and the fruit and/or vegetable preparation having a viscosity in the range of 500-4000 cP.

In some preferred embodiments, the yoghurt is a stirred yoghurt comprising a white base and the high protein fruit and/or vegetable preparation, wherein:

the white base is present in an amount of 10-90% (w/w) of the total product and comprises:
a total amount of protein in the range of 9-18% (w/w) relative to the weight of the white base,
casein in an amount in the range of 0-30% (w/w) relative to the total amount of protein of the white base,
insoluble protein particles having a particle size in the range of 1-10 micron in an amount of at least 5% (w/w),
a total amount of fat of at most 2% (w/w), preferably at most 3% (w/w) relative to the weight of the white base,
a total amount of carbohydrate in the range of 2-20% (w/w) relative to the weight of the white base, and
the fruit and/or vegetable preparation is present in an amount of 10-90% (w/w) of the total product and comprises:
a total amount of protein in the range of 6-20% (w/w) relative to the
weight of the fruit and/or vegetable preparation, and the fruit and/or vegetable preparation having a viscosity in the range of 5-2000 cP.

In some preferred embodiments, the yoghurt is a stirred yoghurt comprising a white base and the high protein fruit and/or vegetable preparation, wherein:

the white base is present in an amount of 50-85% (w/w) of the total product and comprises:
a total amount of protein in the range of 9-18% (w/w) relative to the weight of the white base,
casein in an amount in the range of 0-30% (w/w) relative to the total amount of protein of the white base,
insoluble protein particles having a particle size in the range of 1-10 micron in an amount of at least 5% (w/w),
a total amount of fat of at most 2% (w/w), preferably at most 3% (w/w) relative to the weight of the white base,
a total amount of carbohydrate in the range of 2-20% (w/w) relative to the weight of the white base, and
the fruit and/or vegetable preparation is present in an amount of 15-85% (w/w) of the total product and comprises:
a total amount of protein in the range of 6-20% (w/w) relative to the weight of the fruit and/or vegetable preparation, and the fruit and/or vegetable preparation having a viscosity in the range of 5-2000 cP.

Yet an aspect of the invention pertains to a method of producing the food product as defined herein, the method comprising the steps of
providing a fruit and/or vegetable preparation as defined herein,
providing one or more additional ingredients, and
combining, and optionally also processing, the one or more additional ingredients and the fruit and/or vegetable preparation, thereby producing the food product.

Another aspect of the invention pertains to a method of producing a fruit-flavoured, acidified dairy product, the method comprising the steps of:

a) providing a pasteurised dairy base, e.g. pasteurised yoghurt milk, b) providing a heat-treated high protein fruit and/or vegetable preparation as defined herein, c) contacting the pasteurised dairy base with a chemical or microbial acidifying agent, thereby obtaining the pre-acidification mixture, and d-variant 1) packaging the fruit and/or vegetable preparation and the pre-acidification mixture in the same container and allowing the pre-acidification mixture to acidify in the container, or d-variant 2) allowing the pre-acidification mixture to acidify, optionally processing the acidified mixture, e.g. smoothening by stirring or homogenisation, and packaging a combination of the acidified mixture and heat-treated fruit prep.

The acidified food product may e.g. be is selected from the group consisting of yoghurt, skyr, sour cream, sour buttermilk, cottage cheese, quark, fromage frais, and an acidified whey beverage.

In preferred embodiments of the invention, the acidified dairy product is a yoghurt. The yoghurt may for example be a stirred yoghurt or a drinking yoghurt. Alternatively, the yoghurt may be a set yoghurt. The yoghurt may e.g. be a greek-style yoghurt.

The acidified dairy product typically has a pH in the range 3.0-5.5.

The acidified dairy product may have a total protein content of at least 4% (w/w), for example at least 6% (w/w), such as at least 8% (w/w), e.g. at least 10% (w/w).

For example, the acidified dairy product may have a total protein content in the range of 4-30% (w/w), for example in the range of 6-25%, such in the range of 8-20%, e.g. in the range of 10-18% (w/w).

Step a) involves the provision of the dairy base comprising at least one dairy component and at least one carbohydrate. The dairy base may e.g. be a traditional yoghurt milk or a high protein yoghurt milk which has been enriched with caseins, milk protein concentrate or insoluble protein particles having a particle size in the range of 1-10 micron.

The dairy base of step a) may e.g. contains all or substantially all protein ingredients that go into the acidified dairy base.

The dairy base of step a) may e.g. comprise a total amount of protein of at least 7% (w/w), solids of the denatured whey protein composition amount of at least 2% (w/w).

The dairy base of step a) may e.g. contain the types and amounts of protein ingredients, sweeteners, stabilisers, fats, and minerals mentioned in the context of the high protein, acidified dairy product or the high protein yoghurt.

The dairy base of step a) has been pasteurized by heating it to a temperature of at least 70 degrees C., e.g. in the range of 70-150 degrees C., and maintaining the temperature of the dairy base in that range for a duration sufficient to kill a substantial number of the viable microorganisms of the dairy base. Typically at least 99% of the microorganisms are killed during the pasteurisation. Another purpose of the pasteurisation may be to denature at least some of the native whey protein which may be present in the dairy base of step a).

The duration of the pasteurisation depends on the temperature(s) to which the dairy based is heated and is typically somewhere between 1 second and 30 minutes.

For example, the dairy base may be heated to one or more temperatures in the range of 70-85 degrees C. for 1-30 minutes. The dairy base may e.g. be heated to one or more temperatures in the range of 80-95 degrees C. for 0.5-15 minutes. Alternatively, the dairy base may be heated to one or more temperatures in the range of 90-110 degrees C. for 0.2-10 minutes. For example, the dairy base may be heated to one or more temperatures in the range of 100-150 degrees C. for 1 second-2 minutes.

After the heat-treatment the dairy base is cooled, e.g. to a temperature of at most 50 degrees C., preferably even lower such as at most 45 degrees C. or at most 40 degrees C.

The pasteurized dairy base may also have been subjected to a homogenisation step either before or after the heat-treatment.

The pastuerised dairy base of step a) is contacted with the acidifying agent in step c).

The acidifying agent may for example be a bacterial culture, typically referred to as a starter culture, in which case the addition of the acidifying agent may be perceived as an inoculation of the dairy base, in which case one obtains an inoculated dairy base.

Thus, in some embodiments of the invention the acidifying agent comprises a chemical acidifying agent.

In the context of the present invention the term "chemical acidifying agent" pertains to a chemical compound capable of gradual or instantaneous reduction of the pH of the mixture.

The chemical acidifying agent may for example be a food acceptable acid (also referred as a food acid) and/or a lactone. Examples of useful acids are carboxylic acids, such as citric acid, tartaric acid and/or acetic acid. An example of a useful lactone is glucono delta-lactone (GDL).

In some embodiments of the invention the chemical acidifying agent comprises one or more components selected from the group consisting of acetic acid, lactic acid, malic acid, citric acid, phosphoric acid, and glucono delta-lactone.

The actual concentration of the chemical acidifying agent depends on the specific formulation of dairy base. It is generally preferred that the chemical acidifying agent is used in a sufficient amount to reduce the pH of the mixture to at most pH 5.5, and preferably at most pH 5.0, such as e.g. at most pH 4.6.

In some preferred embodiments of the invention the acidifying agent comprises, or even is, a starter culture.

In principle, any type of starter culture traditionally used in making yoghurt-type high protein acidified dairy product may be used. Starter cultures used in the dairy industry are normally mixtures of lactic acid bacterial strains, but a single strain starter culture may also be useful in the present invention. Thus, in preferred embodiments, the one or more starter culture organism of the present process is a lactic acid bacterial species selected from the group consisting of *Lactobacillus, Leuconostoc, Lactococcus,* and *Streptococcus*. Commercial starter culture comprising one or more of these lactic acid bacterial species may be useful in the present invention.

In some preferred embodiments of the invention the starter culture comprises one or more halotolerant bacterial culture(s).

The amount of the added acidifying agent is typically relatively low compared to the amount of the dairy base.

In some embodiments of the invention, the acidifying agent dilutes the dairy base by a factor of at most 1.05, preferably at most by a factor of 1.01, and even more preferably by a factor of at most 1.005.

Flavouring and/or aromatic agents may be added to the dairy base to obtain a flavoured acidified dairy product. Flavours may be added as solids, but are preferably added in the form of liquids.

During step d) the acidifying agent is allowed to reduce the pH of the dairy base of step c).

If the dairy base of step c) contains a starter culture the dairy base, which is an inoculated dairy base, is incubated under conditions permitting the starter culture to become metabolically active to produce said acidified dairy product. In some preferred embodiments, the inoculated dairy base is incubated at a temperature between 32° C. and 43° C. until the desired pH is reached. The fermentation may be stopped by decreasing the temperature to around 10° C.

If the mixture contains a chemical acidifying agent, the chemical acidifying agent will normally start reducing the pH of the mixture as soon as the chemical acidifying agent forms part of the mixture. Some chemical acidifying agents, such as lactones and slowly dissolving acids, will provide a gradual pH reduction as they react with water or are dissolved.

The temperature of the dairy base during the acidification of step d) is typically in the range of 20-50 degrees C., and preferably in the range of 32-45 degrees C.

It should be noted that step d) comes in 2 variants. According to d-variant 1) the pre-acidification mixture from step c) is packaged together with the fruit and/or vegetable preparation, e.g. on-top of a fruit and/or vegetable preparation layer, and the pre-acidification mixture is allowed to acidify the container in which it is packaged. It is also possible that the acidification has already started when the pre-acidification mixture is packaged according to step d-variant-1).

In step d-variant 2) the pre-acidification mixture is allowed to acidify and reach its target pH before the packaging takes place. The acidified mixture may be subjected to further processing such as smoothing by stirring or homogenisation prior to the packaging. The acidified mixture may be blended with the fruit and/or vegetable preparation or it may be packaged separately or in separate layers contacting each other.

During step d) one or more additional ingredients may be added to the acidified mixture. Useful examples of such additional ingredients are e.g. sweeteners, flavouring agents, additional denatured whey protein composition, stabilisers, emulsifiers and vitamins. Examples of such additional ingredients are mentioned in the context of the composition of the high protein, acidified dairy product or the high protein yoghurt.

The packaging may involve any suitable packaging techniques, and any suitable container may be used for packaging the high protein, acidified dairy product.

The packaging may for example involve aseptic packaging, i.e. the product is packaged under aseptic conditions. For example, the aseptic packaging may be performed by using an aseptic filling system, and it preferably involves filling the product into one or more aseptic container(s).

Examples of useful containers are e.g. bottles, cartons, beakers, bricks, and/or bags.

The packaging is preferably performed at or below room temperature. Thus, the temperature of the product is preferably at most 30 degrees C. during the packaging, preferably at most 25 degrees C. and even more preferably at most 20 degrees C., such as at most 10 degrees C.

The temperature of the product during packaging may for example be in the range of 2-30 degrees C., and preferably in the range of 5-25 degrees C.

It should be noted that embodiments and features described in the context of one of the aspects of the present invention also apply to the other aspects of the invention.

All patent and non-patent references cited in the present application are hereby incorporated by reference in their entirety.

The invention will now be described in further details in the following non-limiting examples.

EXAMPLES

Example 1

Methods of Analysis

Example 1.1

Quantification of the Amount of Insoluble Particles

The amount of insoluble whey protein particles having a particles size in the range of 1-10 micron (effectively encompassing the size range 0.5-10.49 micron) of a denatured whey protein composition is determined using the following procedure:

1. Make a 5% (w/w in water) suspension of the sample to be tested.
2. Let the resulting suspension rehydrate for one hour with gentle agitation (stirring).
3. Homogenize the suspension at 100 bar.
4. Centrifuge a first portion of the suspension at 15000 g for 5 minutes.
5. Collect the resulting supernatant and analyse for total protein (true protein). The amount of total protein of the supernatant is referred to as "A".
6. Analyse a second portion of the suspension (not subjected to centrifugation) for total protein (true protein). The amount of total protein of the suspension is referred to as "B".
7. Subject a third portion of the suspension to particle size distribution analysis by static light scattering and determine the percentage by volume of the particles that has a particle size >10 micron, this percentage is referred to "C".
8. Determine the amount (% w/w relative to total protein) of insoluble whey protein particles having a particle size the range of 1-10 micron as: $P_{1-10}=(((B-A)/B)*100\%)-C$
9. Repeat steps 4-5, but centrifuging at 3000 g for 5 minutes instead of 15000 g. (only the largest part of the particles will be removed). The total protein of the supernatant of step 9 is referred to as "D".
10. Determine the amount (% w/w relative to total protein) of insoluble whey protein particles having a particle size the range of 0.5-1.5 micron as: $P_1=((D-A)/B)*100\%$ The procedure is performed at approx. 15 degrees C. using a refrigerated centrifuge 3-30K from SIGMA Laborzentrifugen GmbH and 85 mL tubes (Order no. 15076), in which the 5% suspension is filled so that the total weight of tube and sample amounts to 96 g.

Particle size distribution analysis is performed using a Malvern Mastersizer (Micro Particle Sizer, Malvern Instruments Ltd., Worcestershire, UK).

Parameters: Particle refractive index 1.52 (real part), 0.1 (imaginary part) and dispersant refractive index 1.33 were used.

Data analysis: The data was fitted using the Mie scattering model (residuals <2%).

Example 1.2

Determination of Soluble CMP, Alpha-Lactalbumin, and Beta-Lactobulin

The content of soluble CMP, alpha-lactalbumin, and beta-lactobulin was analyzed by size exclusion high performance liquid chromatography (SE-HPLC). A Waters 600 E Multi-solvent Delivery System, a Waters 700 Satellite Wisp Injector, and a Waters H90 Programmable Multiwavelength Detector (Waters, Milford, Mass., USA) were used. The elution buffer was composed of 0.15 M Na2S04, 0.09 M KH2P04 and 0.01 M K2HP04. The flow rate was 0.8 mL min-1 and the temperature 20° C.

Twenty-four hours prior to analysis, suspensions of the denatured whey protein compositions were prepared by using a sodium phosphate buffer (0.02 M) to obtain a final protein content of 0.1% (w/v). In addition, standard solutions of alpha-lactalbumin (Sigma-Aldrich Chemie GmbH, Steinheim, Germany) and beta-lactoglobulin (Sigma-Aldrich Chemie GmbH), and caseinomacropeptide at a concentration of 1 mg mL-1 were prepared. Prior to injection, the solutions were stirred and filtered (0.22 micron). A 25 microL sample was injected. The absorbance was recorded at 210 and 280 nm. For all the samples denatured whey protein compositions and the standards, the total protein content was determined according to Example 1.4.

Quantitative determination of the contents of native alpha-lactalbumin, beta-lactoglobulin, and caseinomacropeptide was performed by comparing the peak areas obtained for the corresponding standard proteins with those of the samples.

Example 1.3

Determination of Viscosity

The viscosity of liquid products was measured on a rheometer (Haake rheostress) with a bob/cup system.

The measurement was performed at 5 degrees C. (both the temperature of the liquid sample and the relevant parts of the rheometer had a temperature of 5 degrees C.).

Procedure:
1. Sample Preparation

Each sample is filled into bottles during processing and placed in the laboratory cooler (5° C.) to temperate for 1 day.

2. Setup

Set up the program for measurement of the product on the Haake rheostress, see method setup.

Install the bob/cup system. Check that the temperature of the water bath for HAAKE rheostress is set at 1° C., if not adjust the temperature.

3. Measuring

Only the sample that is to be analysed is removed from the cool storage, the sample bottle is gently turned upside down 3 times to homogenise the sample if it is phase separated during storage. Add 40 ml sample to the cup and start the data-sampling programme. A double repetition is made.

4. Cleaning

When the analysis is finished, dismantle the bob/cup system and clean it with water and soap and afterwards with cold water to temperate the system before the next measurement. Wipe the bob/cup system and install it again for the next sample.

Results:

The viscosity is presented in the unit centipoise (cP). Based on the cP-value read after 90 sec. (t(seq)), an average of the double repetition is calculated. The higher the measured cP values are, the higher the viscosity.

Materials:

For this procedure the following is required:

Haake rheostress 1 rheometer
Bob: Z34 DIN 53019 series
Cup: Z34 DIN53018 series probes
Water bath Haake K20/Haake DC50

Method Setup:

The parameters for the programme were as follows:
Step 1: Measurement position
Step 2: Controlled Stress of 1.00 Pa for 30 sec. at 5.00° C. Frequency of 1.000 Hz. 2 data points are collected
Step 3: Controlled Rate of 50.00 I/s for 120 sec. at 5.00° C. 30 data points are collected
Step 4: Lift apart Example 1.4

Determination of Total Protein

The total protein content (true protein) of a sample is determined by:

1) Determining the total nitrogen of the sample following ISO 8968-1/2|IDF 020-1/2-Milk—Determination of nitrogen content—Part ½: Determination of nitrogen content using the Kjeldahl method.

2) Determining the non-protein nitrogen of the sample following ISO 8968-4|IDF 020-4-Milk—Determination of nitrogen content—Part 4: Determination of non-protein-nitrogen content.

3) Calculating the total amount protein as $(m_{total\ nitrogen} - m_{non-protein-nitrogen})*6.38$.

Example 1.5

Determination of the Water Content of a Powder

The water content of a food product is determined according to ISO 5537:2004 (Dried milk—Determination of moisture content (Reference method)). NMKL is an abbreviation for "Nordisk Metodikkomité for Næringsmidler".

Example 1.6

Determination of Ash Content

The ash content of a food product is determined according to NMKL 173:2005 "Ash, gravimetric determination in foods".

Example 1.7

Determination of the Dry Weight of a Solution

The dry-weight of a solution may be determined according NMKL 110 $2^{nd}$ Edition, 2005 (Total solids (Water)—Gravimetric determination in milk and milk products). NMKL is an abbreviation for "Nordisk Metodikkomité for Næringsmidler".

The water content of the solution can be calculated as 100% minus the relative amount of dry-matter (% w/w).

Example 1.8

Determination of the Total Amount of Lactose

The total amount of lactose is determined according to ISO 5765-2:2002 (IDF 79-2: 2002) "Dried milk, dried ice-mixes and processed cheese—Determination of lactose content—Part 2: Enzymatic method utilizing the galactose moiety of the lactose".

Example 1.9

Determination of the Degree of Denaturation

The denaturation degree of the proteins of the denatured whey protein compositions was analyzed by size exclusion high performance liquid chromatography (SE-HPLC). A Waters 600 E Multisolvent Delivery System, a Waters 700 Satellite Wisp Injector, and a Waters H90 Programmable Multiwavelength Detector (Waters, Milford, Mass., USA) were used. The elution buffer was composed of 0.15 M Na2S04, 0.09 M KH2P04 and 0.01 M K2HP04. The flow rate was 0.8 mL min-1 and the temperature 20° C.

Twenty-four hours prior to analysis, suspensions of the denatured whey protein compositions were prepared by using a sodium phosphate buffer (0.02 M) to obtain a final protein content of 0.1% (w/v). In addition, standard solutions of alpha-lactalbumin (Sigma-Aldrich Chemie GmbH, Steinheim, Germany) and beta-lactoglobulin (Sigma-Aldrich Chemie GmbH), and caseinomacropeptide at a concentration of 1 mg mL-1 were prepared. Prior to injection, the solutions were stirred and filtered (0.22 micron). A 25 microL sample was injected. The absorbance was recorded at 210 and 280 nm. For all the samples denatured whey protein compositions and the standards, the total protein content was determined according to Example 1.4

A quantitative analysis of the native whey protein content was performed by comparing the peak areas obtained for the corresponding standard proteins with those of the samples. Afterwards, the denatured whey protein content of the denatured whey protein compositions were calculated by considering the total protein content of the samples and their quantified native protein. The degree of denaturation was calculated as $(w_{total\ protein} - w_{solutble\ protein})/w_{total\ protein}*100\%$, wherein $w_{total\ protein}$ is the weight of total protein and $w_{solutble\ protein}$ is the weight of soluble protein.

Example 2

Production of a High Protein Denatured Whey Protein Composition

A denatured whey protein composition was prepared using the following method:

Solution:

An aqueous solution containing sweet whey protein concentrate was prepared by dissolving the whey protein concentrate in water to obtain a dry-matter content of 16% and adjusting the pH to 6.4.

Denaturation and Microparticulation:

Denaturation and microparticulation was performed in a 6+6 Scraped Surface Heat Exchanger (SSHE), APV Shear Agglomerator, from APV/SPX, Denmark.

After passage through a holding cell (60 sec) the product was cooled down in a SSHE followed by a plate heat exchanger (PHE) to 10° C.

During the heat treatment (80 degrees C. for a duration of 10 minutes) the protein was denaturated and particles in the size 0.5-10 micron were formed.

The product suspension was pumped to a storage tank, and some of it was subsequently dried to a powder by means of spray-drying.

The aqueous whey protein solution and the suspension obtained from the heat denaturation/microparticulation were subsequently characterised with respect to content of native dry-matter, total protein, total fat, total lactose, ash content, content of native beta-lactoglobulin, content of native alpha-lactalbumin, content of native CMP, degree of microparticulation, particle size, and pH.

Results

The results of the characterisation of the solution of sweet WPC and the suspension of denatured, microparticulated whey protein are presented in Table 1. As can be seen, significant amounts of native beta-lactoglobulin and alpha-lactalbumin of the solution has been denatured (approx. 88% beta-lactoglobulin and approx. 69% alpha-lactalbumin), whereas the level of CMP seems to be nearly the same in the suspension and in the solution.

TABLE 1

Comparison of the composition of the WPC solution and the product suspension.

|  | Solution of sweet WPC | Product suspension |
|---|---|---|
| % Dry matter | Approx. 16 | Approx. 16 |
| % Total protein | 13.0 | 13.0 |
| % Fat | 0.90 | 0.90 |
| % Lactose | 0.45 | 0.45 |
| % Ash | 0.55 | 0.55 |
| % Native beta-lactoglobulin relative to total protein | 55.0 | 6.5 |
| % Native alpha-lactalbumin relative to total protein | 18.0 | 5.5 |
| % native CMP of total protein | 13.5 | 13.5 |
| Particle degree* | <10 | Approx. 67 |
| Particle size | 0.1-1 micron | 0.5-10 micron |
| pH | 6.4 | 6.4 |

*Content of insoluble whey protein particles in the size range 0.5-10 micron (% w/w total protein)

The non-protein-nitrogen content of the product suspension was 0.15% (w/w).

The spray-dried denatured whey protein composition had a solid content of dry-matter content of approx. 95%.

Example 3

Development of an High Protein, Fruit-Flavours Beverage

The present inventors have made several attempts to develop a high protein beverage containing a mixture of fruit juice and a substantial amount of a denatured whey protein composition containing 45% protein (microparticulated WPC45) (w/w) but found it challenging to develop a product having an acceptable taste and acceptable textural properties.

The inventors found that surprisingly the problem was solved by replacing the microparticulated WPC45 (protein ingredient A) with a denatured whey protein composition containing 82% protein (similar to that product in Example 1—referred to as protein ingredient B) and by carefully controlling the pH of the beverage.

The following experiments were set up to document the findings of the inventors.

Six samples of high protein beverage containing 8.0% (w/w) protein using two alternative protein sources and five different pH'es. Each sample was produced by mixing 0.36 kg protein ingredient A or 0.20 kg protein ingredient B, 80 g sucrose, sufficient citric acid, and water to obtain a 1.20 kg premix of a predefined pH (pH 6.0, 5.5, 5.0, 4.5 or 4.0). The premix was allowed to rest for ½ hour to give the protein ingredients an opportunity to rehydrate before continuing the process. Next, the premix was mixed with 0.80 kg commercial apple juice containing 10% (w/w) sugar (Rynkeby, Denmark), and subsequently pasteurised at 90 degrees C. for 1 minute and then subjected to two-stage homogenisation at 150 bar and 50 bar respectively. Finally the homogenized beverage was cooled to 5 degrees C. and filled into plastic bottles (267 mL).

The protein ingredient and final pH of the six samples are shown in Table 2.

TABLE 2

Six samples of high protein fruit beverage including their protein ingredient and their target pH

| Sample | Ingredient | Protein content (% w/w) | pH |
|---|---|---|---|
| 1 | A | 8 | 4.5 |
| 2 | B | 8 | 6 |
| 3 | B | 8 | 5.5 |
| 4 | B | 8 | 5 |
| 5 | B | 8 | 4.5 |
| 6 | B | 8 | 4 |

Characterisation

The six samples were characterised by sensory testing and scored on a scale of 1 (lowest)-15 (highest) with respect to their:

Perceived oral viscosity
Fruitiness
Level of off-flavours

The sensory testing was performed by a panel of 5 persons having received training in sensory testing.

The relationship between the pH of the beverage sample and the perceived fruitiness of the sample is illustrated in FIG. 1. It is clear that the fruitiness increases dramatically when reducing the pH from pH 5.0 to pH 4.5. The sensory testing therefore verified the inventors initial finding that careful control of pH is important to the taste and flavour of a high protein fruit-flavoured drink.

The present experiments also allowed for a simple comparison of the fruit-flavoured beverages containing the Ingredient A (45% protein), which was used initially, and Ingredient B (82% protein) by comparing the samples 1 and 5.

The beverage of sample 1 (with Ingredient A, pH 4.5) had a significantly higher perceived viscosity than the beverage of sample 5 (with Ingredient B, pH 4.5) and was therefore perceived less drinkable. Furthermore, the beverage of sample 5 was perceived as having a higher degree of freshness than the beverage of sample 1.

Conclusion

It has been documented that careful pH control of high protein, fruit-flavoured beverages is important to obtain a product with a good taste, e.g. a high level of fruitiness, and particularly that the pH of the final product should be lower than pH 5.0. It has furthermore been shown that it is advantageous to use a high protein denatured whey composition as protein source (such as Ingredient B) instead of a denatured whey composition having a lower content of protein, and it is believed that the relatively high total protein:ash content weight ratio of Ingredient B plays an important role (the total protein:ash content weight ratio of Ingredient B is approximately).

1.1 Example 4

Production of High Protein Fruit Preparations Based on Whole Strawberries

Samples of high protein fruit preparations based on whole strawberries can be prepared as described below (samples no. 1-2 are for reference; samples 3-12 are according to the invention).

1.1.1 Ingredients:

|  | Fruit preparation sample no. | | | | | |
|---|---|---|---|---|---|---|
| Ingredient (g) | 1 | 2 | 3 | 4 | 5 | 6 |
| Pectin | 0 | 0 | 0 | 2 | 5 | 10 |
| Blended strawberry | 350 | 350 | 350 | 350 | 350 | 350 |
| Sucrose | 300 | 275 | 275 | 275 | 275 | 275 |
| Water | 300 | 300 | 300 | 300 | 300 | 300 |
| 0.5M Citric acid solution | to target pH | to target pH | to target pH | to target pH | to target pH | to target pH |
| Protein: | | | | | | |
| Gelatin powder | 100 | | | | | |
| WPC80 powder | | 125 | | | | |
| mpWPC powder | | | 125 | 125 | 125 | 125 |
| Total protein of the final fruit preparation (w/w)[1] | 10% | 10% | 10% | 10% | 10% | 10% |

[1] Due to evaporation of water during the process, each sample batch yields approx. 1.00 kg high protein fruit preparation.

|  | Fruit preparation sample no. | | | | | |
|---|---|---|---|---|---|---|
| Ingredient (g) | 7 | 8 | 9 | 10 | 11 | 12 |
| Pectin | 0 | 2 | 5 | 0 | 2 | 5 |
| Blended strawberry | 350 | 350 | 350 | 350 | 350 | 350 |
| Sucrose | 275 | 275 | 275 | 275 | 275 | 275 |
| Water | 300 | 300 | 300 | 300 | 300 | 300 |
| 0.5M Citric acid solution | to target pH | to target pH | to target pH | to target pH | to target pH | to target pH |
| Protein: | | | | | | |
| Gelatin powder | | | | | | |
| WPC80 powder | | | | | | |
| mpWPC powder | 100 | 100 | 100 | 150 | 150 | 150 |
| Total protein of the final fruit preparation (w/w)[1] | 8% | 8% | 8% | 12% | 12% | 12% |

[1] Due to evaporation of water during the process, each sample batch yields approx. 1.00 kg high protein fruit preparation.

Pectin:

The used pectin is a high methylester pectin.

Blended Strawberry:

The blended strawberries are obtained by thawing a batch of freshly frozen strawberries and blending the thawed strawberries in a food processor, thereby obtaining a puree-like strawberry composition.

WPC80 Powder:

The WPC80 powder is based on ultra/dia-filtered sweet whey and contains approx. 80% native whey protein and substantially no microparticulated whey protein particles. The WPC80 powder furthermore comprises approx. 3% lactose and approx. 6% fat.

mpWPC Powder:

The mpWPC powder is produces according to Example 2 and has the same specifications except for a total protein content of 80% (w/w).

1.1.2 Process:

The protein powder is mixed into the water in a vessel and allowed to hydrate for 1 hour at 10 degrees C. The protein mixture is heated to 60 degrees C., and if pectin is used, it is added to and dissolved in the heated protein mixture.

The blended strawberry and sucrose is mixed and heated to 90 degrees C. in a separate vessel, and subsequently mixed with the heated protein mixture and the pH of the combined mixture is adjusted to 3.8 using 0.5 M citric acid solution. The combined mixture is finally heated to 80 degrees C., held at that temperature for 2 minutes and hot-filled into sterile 200 mL containers.

Due to evaporation of water during the process, each sample batch yields approx. 1.00 kg high protein fruit preparation.

1.1.3 Conclusion:

The present inventors have experimented with various protein types such as gelatin and native whey protein and have found that these form a firm, non-pumpable gel when heated at acidic pH. However, they have found that microparticulated protein, such as microparticulated whey protein, is less prone to gel formation when heat-treated at acidic pH and have found that such microparticulated protein is well suited for the production of high protein fruit preparations.

This example demonstrates that a pumpable, high protein fruit preparation can be produced using microparticulated protein.

The example furthermore demonstrates that pumpable, high protein fruit preparations can be produced both with and without carbohydrate thickening agents such as pectins.

1.2 Example 5

Production of High Protein Fruit Preparations Based on Strawberry Juice Concentrate Samples of high protein fruit preparations based on strawberry juice concentrate can be prepared as described below.

1.2.1 Ingredients:

|  | Fruit preparation sample no. | | | | | |
|---|---|---|---|---|---|---|
| Ingredient (g) | 13 | 14 | 15 | 16 | 17 | 18 |
| Pectin | 0 | 2 | 0 | 2 | 0 | 2 |
| Strawberry juice concentrate | 100 | 100 | 100 | 100 | 100 | 100 |
| Aspartame | 0.9 | 0.9 | 0.9 | 0.9 | 0.9 | 0.9 |

-continued

| Ingredient (g) | | | | | | |
|---|---|---|---|---|---|---|
| Sucrose | 100 | 100 | 100 | 100 | 100 | 100 |
| Water | 675 | 675 | 650 | 650 | 600 | 600 |
| 0.5M Citric acid solution | to target pH | to target pH | to target pH | to target pH | to target pH | to target pH |
| Protein: | | | | | | |
| mpWPC powder | 175 | 175 | 200 | 200 | 250 | 250 |
| Total protein of the final fruit preparation (w/w) | 14% | 14% | 16% | 16% | 20% | 20% |

| | Fruit preparation sample no. | | | | | |
|---|---|---|---|---|---|---|
| Ingredient (g) | 19 | 20 | 21 | 22 | 23 | 24 |
| Pectin | 0 | 2 | 0 | 2 | 0 | 2 |
| Strawberry juice concentrate | 100 | 100 | 100 | 100 | 100 | 100 |
| Aspartame | 0.9 | 0.9 | 0.9 | 0.9 | 0.9 | 0.9 |
| Sucrose | 100 | 100 | 100 | 100 | 100 | 100 |
| Water | 750 | 750 | 725 | 725 | 700 | 700 |
| 0.5M Citric acid solution | to target pH | to target pH | to target pH | to target pH | to target pH | to target pH |
| Protein: | | | | | | |
| mpWPC powder | 100 | 100 | 125 | 125 | 150 | 150 |
| Total protein of the final fruit preparation (w/w) | 8% | 8% | 10% | 10% | 12% | 12% |

Pectin:

The used pectin is a high methylester pectin.

Strawberry Juice Concentrate:

The used strawberry juice concentrate is Strawberry Juice Concentrate, Brix 65 (Milne Fruit Products, USA)

mpWPC Powder:

The mpWPC powder is produced according to Example 2 and has the same specifications except for a total protein content of 80% (w/w).

1.2.2 Process:

The protein powder is dispersed into the water in a vessel and allowed to hydrate for 1 hour at 10 degrees C. The protein mixture is heated to 60 degrees C., and if pectin is used, it is added to and dissolved in the heated protein mixture.

The strawberry juice concentrate, sucrose and aspartame is mixed and heated to 90 degrees C. in separate vessel, and subsequently mixed with the heated protein mixture and the pH of the combined mixture is adjusted to 3.8 using 0.5 M citric acid solution. The combined mixture is finally heated to 80 degrees C., held at that temperature for 2 minutes and hot-filled into sterile 200 mL containers.

Due to evaporation of water during the process, each sample batch yields approx. 1.00 kg high protein fruit preparation.

1.2.3 Conclusion:

The present inventors have found that it is advantageous to use fruit juice concentrates to obtain fruit preparations having very high protein contents.

The inventors have furthermore found that by replacing some of the bulk sweetener (sugar and/or sugar alcohol) with high intensity sweetener, an improved, less viscous fruit preparation is obtained. This approach may be used to introduce more protein into the fruit and/or vegetable preparation without destroying the pumpability or organoleptic properties of the preparation.

1.3 Example 6

Preparation of High Protein, Fruit Flavoured Stirred Yoghurt

Samples of high protein, fruit-flavoured stirred yoghurt can be produced in the following manner.

1.3.1 Preparation of the White Base

The white base for the stirred yoghurt is produced with the following ingredients:

| Ingredient | Content % (w/w) |
|---|---|
| Denatured whey protein powder of Example 1 (total protein: 82%) | 3.80 |
| Milk protein concentrate (total protein: 77%) | 6.80 |
| Skimmed milk | 89.40 |

Nutritional Composition of the White Base:

| Component | Content % (w/w) |
|---|---|
| Protein | 10.05 |
| Fat | 0.44 |
| Carbohydrates | 6.51 |
| Total solids | 18.38 |

Process for Preparing the White Base:

The powders are mixed with the liquid ingredients and allowed to hydrate for 1 hour at 5° C. Subsequently, the resulting suspension is preheated to 65° C. and homogenized in two steps (first at 200 bar and subsequently at 50 bar). After the homogenisation, the suspension is pasteurised at 90° C. for 5 min, cooled and incubated with 0.02% lactic acid starter culture (YC-183 from Chr. Hansen) and allowed to incubate at 42° C. until the pH reaches pH 4.5. The incubated product is subjected to smoothing at 9 bar using back pressure and finally cooled and stored at 5 degrees C.

1.3.2 Adding the Fruit Preparation

The cooled white base is mixed with the fruit preparations of Examples 4 and 5 in the following proportions:

| | Stirred yoghurt samples | | | | | |
|---|---|---|---|---|---|---|
| | A | B | C | D | E | F |
| White base (g) | 620 | 770 | 620 | 770 | 620 | 770 |
| Fruit preparation sample no. | 10 | 10 | 4 | 4 | 8 | 8 |
| Fruit preparation (g) | 380 | 230 | 380 | 230 | 380 | 230 |
| Total protein of the resulting stirred yoghurt | 10.8% | 10.5% | 10.0% | 10.0% | 9.3% | 9.6% |

| | Stirred yoghurt samples | | | | | |
|---|---|---|---|---|---|---|
| | G | H | I | J | K | L |
| White base (g) | 620 | 770 | 620 | 770 | 620 | 770 |
| Fruit preparation sample no. | 13 | 13 | 15 | 15 | 17 | 17 |

-continued

| | Stirred yoghurt samples | | | | | |
|---|---|---|---|---|---|---|
| | G | H | I | J | K | L |
| Fruit preparation (g) | 380 | 230 | 380 | 230 | 380 | 230 |
| Total protein of the resulting stirred yoghurt | 11.6% | 11.0% | 12.3% | 11.4% | 13.8% | 12.3% |

The resulting high protein, fruit-flavour stirred yoghurt is filled in sterile 200 mL yoghurt beakers and sealed.

1.3.3 Conclusion

The example demonstrates that it is possible to prepare a high protein, fruit-flavoured stirred yoghurt without diluting the protein content of the white yoghurt base. The example furthermore demonstrates that the high protein fruit preparation can be used to give the final yoghurt product a higher protein content than that of the white base.

This opens up for a new approach for producing high protein, fruit flavoured dairy products, which involves providing a conventional dairy base (e.g. a conventional yoghurt white base) and adding a high protein, fruit preparation to the conventional dairy white base to produce a dairy product with a higher level of protein compared to the conventional dairy product.

1.4 Example 7

Preparation of a High Protein, Fruit Flavoured Drinking Yoghurt

Samples of high protein, fruit-flavoured drinking yoghurt can be produced in the following manner.

1.4.1 Preparation of the White Base

The white base for the drinking yoghurt is produced with the following ingredients:

| Ingredient | Content % (w/w) |
|---|---|
| Denatured whey protein powder of Example 1 (total protein: 82%) | 8.64 |
| Sucrose | 5.00 |
| Cream, 38% fat | 3.10 |
| Skimmed milk | 83.26 |

Nutritional Composition of the White Base:

| Composition | Content % (w/w) |
|---|---|
| Protein | 10.00 |
| Fat | 1.79 |
| Carbohydrates | 9.39 |
| Total solids | 22.28 |

Process for Preparing the White Base:

The powders are mixed with the liquid ingredients and allowed to hydrate for 1 hour at 5° C. Subsequently, the resulting suspension is preheated to 65° C. and homogenized in two steps (first at 200 bar and subsequently at 50 bar). After the homogenisation, the suspension is pasteurised at 90° C. for 5 min, cooled and incubated with 0.02% lactic acid starter culture (YC-183 from Chr. Hansen) and allowed to incubate at 42° C. until the pH reaches pH 4.5. The incubated product is subjected to smoothing at 9 bar using back pressure and finally cooled and stored at 5 degrees C.

1.4.2 Adding the Fruit Preparation

The cooled white base is mixed with fruit preparations of Examples 5 in the following proportions:

| | Drinking yoghurt samples | | | | | |
|---|---|---|---|---|---|---|
| | M | N | O | P | Q | R |
| Amount of white base for drinking yoghurt (g) | 620 | 770 | 620 | 770 | 620 | 770 |
| Fruit preparation sample no. | 19 | 19 | 21 | 21 | 15 | 15 |
| Amount of fruit preparation (g) | 38% | 23% | 38% | 23% | 38% | 23% |
| Total protein of the resulting drinking yoghurt | 9.3% | 9.6% | 10.0% | 10.0% | 12.3% | 11.4% |

The resulting high protein, fruit-flavour drinking yoghurt samples are filled in sterile 200 mL bottles and sealed.

1.4.3 Conclusion

This example demonstrates that it is possible to prepare a high protein, fruit-flavoured drinking yoghurt without dilution the protein content of the white drinking yoghurt base. The example furthermore demonstrates that the high protein fruit preparation can be used to give the final drinking yoghurt product a higher protein content than that of the drinking yoghurt white base.

As discussed above, this opens up for a new approach for producing high protein, fruit flavoured dairy products, which involves providing a normal acidified dairy base (e.g. a normal yoghurt white base) and adding a high protein, fruit preparation to the normal acidified white base.

1.5 Example 8

Preparation of a High Protein, Fruit Flavoured Set Yoghurt

Set-style high protein, fruit-flavoured yoghurts can be prepared in the following way:

Yoghurt Sample S:

66 g high protein fruit preparation (Sample 11) is filled into an empty 200 mL yoghurt beaker and allowed to settle. 134 g inoculated, but non-acidified, white base from Example 6 is filled on top of the high protein fruit preparation and the beaker is sealed. The beaker is stored at 42 degrees C. for 10 hours during which the inoculated white base is acidified to approx. pH 4.6 which causes the white base to set (form a gel).

The beaker and its content is subsequently cooled to 5 degrees C. and stored at this temperature.

The set yoghurt product of sample S has a total protein content of 10.7%.

Yoghurt Sample T:

66 g high protein fruit preparation (Sample 16) is filled into an empty 200 mL yoghurt beaker and allowed to settle. 134 g inoculated, but non-acidified, white base from Example 6 is filled on top of the high protein fruit preparation and the beaker is sealed. The beaker is stored at 42 degrees C. for 10 hours during which the inoculated white base is acidified to approx. pH 4.6 which causes the white base to set (form a gel).

The beaker and its content is subsequently cooled to 5 degrees C. and stored at this temperature.

The set yoghurt product of sample T has a total protein content of 12.0%.

The invention claimed is:

1. A high protein, fruit-flavoured beverage containing:
   water,
   a sweetener
   a total amount of protein of at least 4% (w/w)
   a total amount of the solids of a denatured whey protein composition of at least 2% (w/w) relative to the total weight of the beverage, the denatured whey protein composition containing:
   a total amount of protein of at least 60% (w/w) on a dry weight basis relative to the total weight of the denatured whey protein composition,
   insoluble whey protein particles having a particle size in the range of 1-10 microns, where the amount of said insoluble whey protein particles is in the range of 50-100% (w/w) relative to the total amount of protein of the denatured whey protein composition,
   a fruit flavouring agent in an amount of at least 5% (w/w) relative to the total weight of the beverage, and
   a food acid,
   said beverage having a pH in the range of 3.0-4.8.

2. The high protein, fruit-flavoured beverage according to claim 1, wherein the denatured whey protein composition is:
   a powder, or
   an aqueous suspension.

3. The high protein, fruit-flavoured beverage according to claim 1, wherein the total protein:ash content weight ratio of the denatured whey protein composition is at least 15.

4. The high protein, fruit-flavoured beverage according to claim 1, wherein the total amount of protein is at least 5% (w/w).

5. The high protein, fruit-flavoured beverage according to claim 1, wherein the beverage has been heat-treated.

6. The high protein, fruit-flavoured beverage according to claim 1, wherein the sweetener comprises a sugar, a sugar alcohol and/or a high intensity sweetener.

7. The high protein, fruit-flavoured beverage according to claim 1, wherein the fruit flavouring agent is selected from orange flavour, lemon flavour, lime flavour, pine apple flavour, apple flavour, pear flavour, strawberry flavour, cherry flavour, cranberry flavour, grape fruit flavour.

8. The high protein, fruit-flavoured beverage according to claim 1, wherein the fruit flavouring agent also contains food acid.

9. The high protein, fruit-flavoured beverage according to claim 1, wherein substantially all the food acid of the beverage has been provided by the fruit flavouring agent.

10. The high protein, fruit-flavoured beverage according to claim 1, wherein food acid is selected from the group consisting of citric acid, malic acid, tartaric acid, acetic acid, benzoic acid, butyric acid, lactic acid, fumaric acid, succinic acid, ascorbic acid, adipic acid, phosphoric acid, and mixtures thereof.

11. The high protein, fruit-flavoured beverage according to claim 1, containing a total amount of food acid of at least 0.1% (w/w).

12. The high protein, fruit-flavoured beverage according to claim 1, wherein the fruit flavouring agent comprises a fruit juice or a fruit juice concentrate.

13. The high protein, fruit-flavoured beverage according to claim 1, containing less than 5% casein relative to the total amount of protein.

14. The high protein, fruit-flavoured beverage according to claim 1, containing at most $10^6$ viable bacteria per mL.

15. The high protein, fruit-flavoured beverage according to claim 1, having a viscosity in the range of 3-400 cP.

16. The high protein, fruit-flavoured beverage according to claim 1, having a total ash content of at most 2% (w/w).

17. A method of producing a high protein, fruit-flavoured beverage according to claim 1, the method comprising:
   a) forming a mixture comprising:
      water,
      sweetener,
      a total amount of protein of at least 4% (w/w)
      a total amount of solids of a denatured whey protein composition of at least 2% (w/w) relative to the total weight of the beverage, the denatured whey protein composition containing:
      a total amount of protein of at least 60% (w/w) relative to the total weight of the partly denatured whey protein composition,
      insoluble whey protein particles having a particle size in the range of 1-10 microns, where the amount of said insoluble whey protein particles is in the range of 50-100% (w/w) relative to the total amount of the denatured whey protein composition,
      a fruit flavouring agent in an amount of at least 5% (w/w) relative to the total weight of the beverage, and
      food acid
   b) optionally, if the pH of mixture is higher than pH 4.8, reducing the pH of mixture to a pH in the range of 3.0-4.8 by addition of a food acid, and
   c) packaging the mixture,
   wherein:
      i) the mixture is heat-treated prior, during or after packaging, or
      ii) the mixture is made of one or more heat-treated ingredients.

18. The high protein, fruit-flavoured beverage according to claim 1, wherein the denatured whey protein composition further contains:
   i. insoluble whey protein particles having a particle size of more than 10 microns in an amount of at most 10% (w/w) relative to the total amount of protein of the denatured whey protein composition; or
   ii. insoluble whey protein particles having a particle size of less than 0.5 microns in an amount of at most 10% (w/w) relative to the total amount of protein of the denatured whey protein composition; or
   iii. insoluble whey protein particles having a particle size of more than 10 microns in an amount of at most 10% (w/w) relative to the total amount of protein and insoluble whey protein particles having a particle size of less than 0.5 microns in an amount of at most 10% (w/w) relative to the total amount of protein.

19. The high protein, fruit-flavoured beverage according to claim 1, containing a total amount of protein of at least 70% (w/w) on a dry weight basis relative to the total weight of the denatured whey protein composition.

20. The high protein, fruit-flavoured beverage according to claim 1, containing a fruit flavouring agent in an amount of 5%-80% (w/w) relative to the total weight of the beverage.

* * * * *